US012561525B2

(12) United States Patent　　　(10) Patent No.: US 12,561,525 B2
Verma et al.　　　　　　　　　　　(45) Date of Patent:　　Feb. 24, 2026

(54) SYSTEMS AND METHODS FOR ESTABLISHING MULTILINGUAL CONTEXT-PRESERVING CHUNK LIBRARY

(71) Applicant: PAYPAL, INC., San Jose, CA (US)

(72) Inventors: Reyha Verma, Bangalore (IN);
Nandana Murthy, San Jose, CA (US);
Santosh Addanki, Cupertino, CA (US);
Soujanya Lanka, Singapore (SG);
Sriram Kodey, Vijayawada (IN);
Zehong Ma, Shanghai (CN)

(73) Assignee: PAYPAL, INC., San Jose, CA (US)

(*) Notice: Subject to any disclaimer, the term of this patent is extended or adjusted under 35 U.S.C. 154(b) by 261 days.

(21) Appl. No.: 18/362,702

(22) Filed: Jul. 31, 2023

(65) Prior Publication Data

US 2025/0045524 A1　　　Feb. 6, 2025

(51) Int. Cl.
*G06F 40/289*　　　(2020.01)
*G06F 40/263*　　　(2020.01)
*G06F 40/284*　　　(2020.01)

(52) U.S. Cl.
CPC .......... *G06F 40/289* (2020.01); *G06F 40/263* (2020.01); *G06F 40/284* (2020.01)

(58) Field of Classification Search
None
See application file for complete search history.

(56) References Cited

U.S. PATENT DOCUMENTS

| | | | | |
|---|---|---|---|---|
| 11,023,675 | B1 * | 6/2021 | Neervannan | .......... G06F 40/211 |
| 11,531,804 | B2 * | 12/2022 | Walker | .................. G06F 40/117 |
| 11,886,800 | B1 * | 1/2024 | Wang | .................... G06F 40/284 |
| 11,977,836 | B1 * | 5/2024 | Archambeau | ......... G06F 40/279 |
| 2001/0013047 | A1 * | 8/2001 | Marques | ............. G06F 16/9535 |
| | | | | 707/999.005 |
| 2003/0182102 | A1 | 9/2003 | Corston-Oliver et al. | |
| 2012/0095748 | A1 * | 4/2012 | Li | ......................... G06F 40/263 |
| | | | | 704/8 |
| 2012/0143595 | A1 * | 6/2012 | Li | ......................... G06F 16/345 |
| | | | | 704/E11.001 |
| 2012/0251016 | A1 * | 10/2012 | Lyons | ................... G06F 40/151 |
| | | | | 382/276 |

(Continued)

OTHER PUBLICATIONS

PCT/US24/39056, International Search Report and Written Opinion, Nov. 20, 2024, 12 pages.

(Continued)

*Primary Examiner* — Douglas Godbold
(74) *Attorney, Agent, or Firm* — Haynes and Boone, LLP

(57)　　　　　　　ABSTRACT

There are provided systems and methods for building a chunked text as input for a machine learning model. An example system may receive an input text in at least one language. The system may determine a character limit corresponding to the language for deriving a segment from the input text, a character number of the segment does not exceed the character limit. The system may divide the input text into one or more segments sequentially based on a set of characteristics of input text, such as conjunction and punctuation. The system may generate a list of segments including the one or more segments by appending segment sequentially. The system may generate a list of combined segments as the input for the machine learning model by appending each segment in the list of segments sequentially.

20 Claims, 9 Drawing Sheets

(56) References Cited

U.S. PATENT DOCUMENTS

| | | | | |
|---|---|---|---|---|
| 2015/0286618 | A1 | 10/2015 | Walker | |
| 2015/0293898 | A1* | 10/2015 | Ding | G06F 40/284 |
| | | | | 715/264 |
| 2016/0259851 | A1 | 9/2016 | Hopkins et al. | |
| 2017/0364510 | A1* | 12/2017 | Huang | G06F 16/951 |
| 2017/0364586 | A1* | 12/2017 | Krishnamurthy | G06F 16/3329 |
| 2018/0143975 | A1* | 5/2018 | Casal | G06F 40/51 |
| 2019/0057078 | A1 | 2/2019 | Boguraev et al. | |
| 2020/0311212 | A1* | 10/2020 | Moss | G06F 40/30 |
| 2021/0056571 | A1* | 2/2021 | Su | G06Q 30/0201 |
| 2022/0165249 | A1* | 5/2022 | Wu | G10L 13/02 |
| 2022/0335203 | A1* | 10/2022 | Van Dyke | G06F 40/205 |
| 2023/0073602 | A1* | 3/2023 | Akula | G06F 40/284 |
| 2023/0267923 | A1* | 8/2023 | Chun | G10L 15/1822 |
| | | | | 704/235 |
| 2023/0353407 | A1* | 11/2023 | Giovanardi | G06F 40/289 |
| 2024/0012840 | A1* | 1/2024 | Al-Qurishi | G06F 40/279 |

OTHER PUBLICATIONS

Devlin, J. et al., "BERT: Pre-training of Deep Bidirectional Transformers for Language Understanding", retrieved from https://arxiv.org/pdf/1810.04805.pdf, 2019.

Jaiswal A. et al., "ChunkSumm: Extending BERT for Long Document Summarization", retrieved from https://dcsi.cs.dal.ca/wp-content/uploads/2022/07/DCSI-2022_paper_1571.pdf, 2022.

* cited by examiner

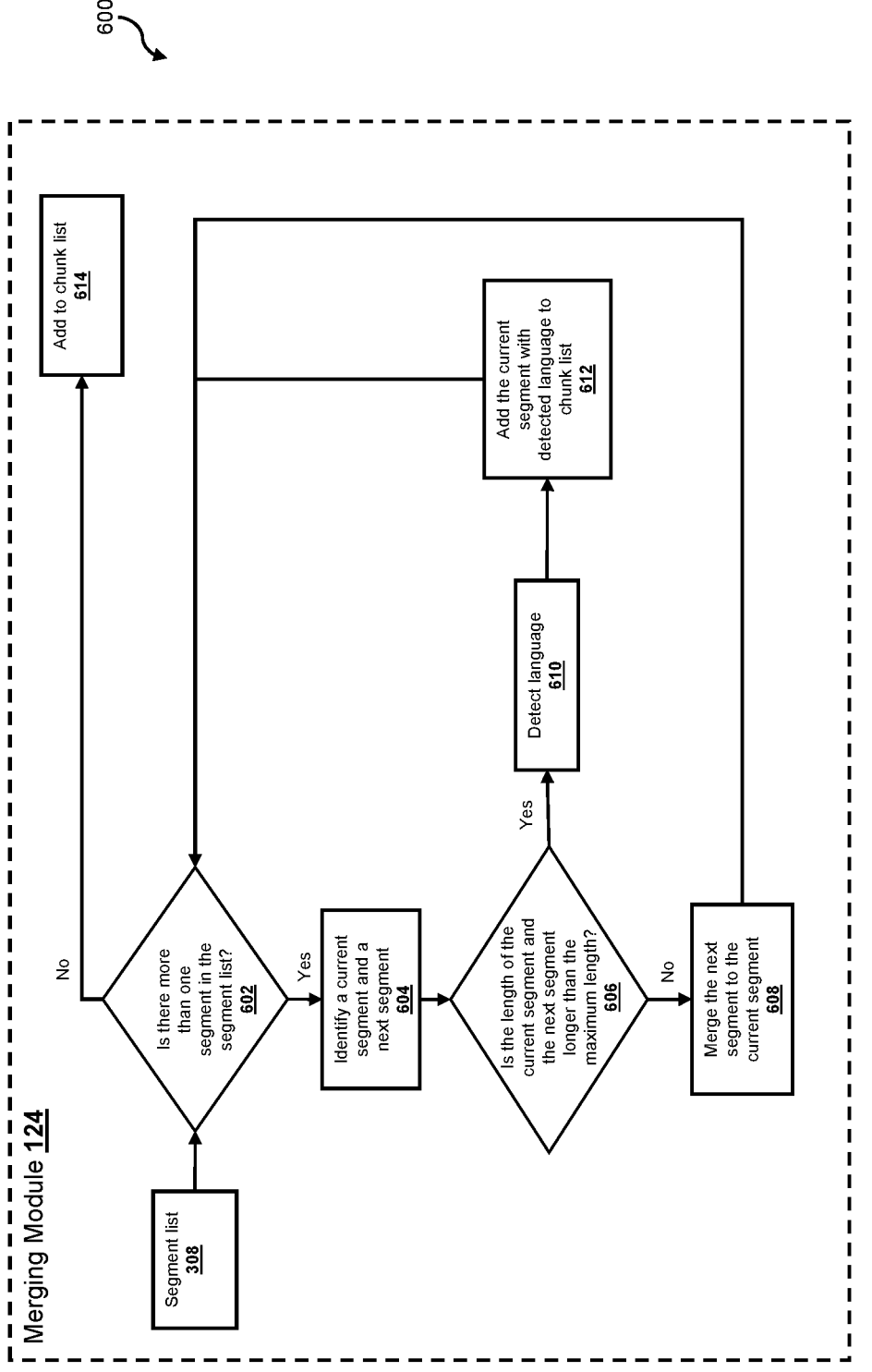

600

Merging Module 124

Segment list 308

Is there more than one segment in the segment list? 602

No → Add to chunk list 614

Yes → Identify a current segment and a next segment 604

Is the length of the current segment and the next segment longer than the maximum length? 606

Yes → Detect language 610 → Add the current segment with detected language to chunk list 612

No → Merge the next segment to the current segment 608

Figure 6

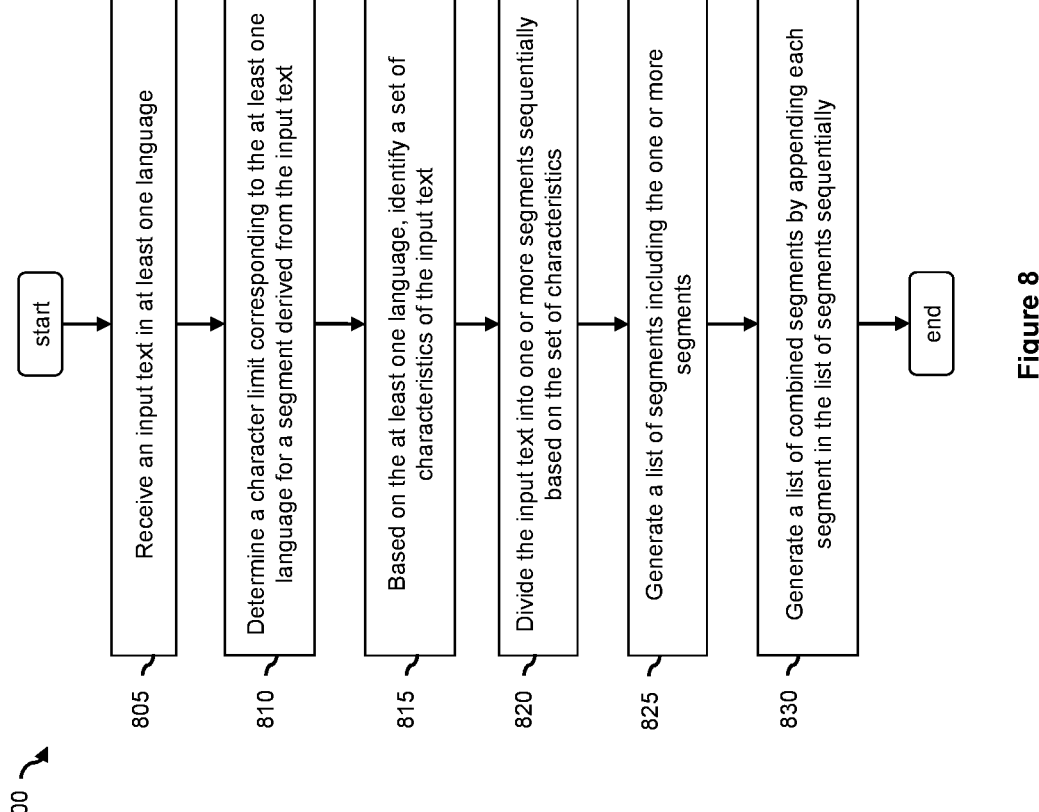

800 start

805 — Receive an input text in at least one language

810 — Determine a character limit corresponding to the at least one language for a segment derived from the input text 815 — Based on the at least one language, identify a set of characteristics of the input text 820 — Divide the input text into one or more segments sequentially based on the set of characteristics 825 — Generate a list of segments including the one or more segments 830 — Generate a list of combined segments by appending each segment in the list of segments sequentially end

Figure 8

SYSTEMS AND METHODS FOR ESTABLISHING MULTILINGUAL CONTEXT-PRESERVING CHUNK LIBRARY

TECHNICAL FIELD

The present application generally relates to establishing a text library for classifying data using a machine learning model, and more specifically, to establishing a text library including text that is chunked based on characteristics of languages used in the text.

BACKGROUND

For most of the machine learning models, especially natural language processing models (e.g., transformer-based pretrained language models), there is a fixed maximum length on a character number of input text (e.g., 512 characters) that a user can input. The maximum length of the input text limits the capability of the machine learning model to ingest a longer input (e.g., text that is beyond the maximum length). In order to process the input text that exceeds the maximum length, the input text is required to be chunked or split into several chunks that are under the maximum and are sent to the machine learning model separately. Existing solutions may split the input text that exceeds the maximum length into sentences, words, or characters based on the maximum length (e.g., splitting the input text into segments with the same length that is under the maximum length).

However, because of the input text being chunked randomly instead of being chunked at logical break points, the chunked input (e.g., chunks split from the input text) can lose its context (e.g., a completed sentence being chunked into two chunks) and eventually compromise the performance of the machine learning model (e.g., accuracy, processing time, and processing efficiency). Furthermore, the existing solutions cannot process an input text with multiple languages, which leads the machine learning models to predict outputs inaccurately when the language in the input text does not match a set source language.

As such, it is desirable to logically chunk an input text for the machine learning models while preserving the context of the input text and an identified language for each chunk, so that the machine learning model can efficiently and accurately output predictions.

BRIEF DESCRIPTION OF THE DRAWINGS

FIG. 6 illustrates an exemplary data flow for merging segments according to an embodiment of the present disclosure;

FIG. 8 is a flowchart showing a process of generating chunked text as input for a machine learning model according to an embodiment of the present disclosure.

Figure 1:
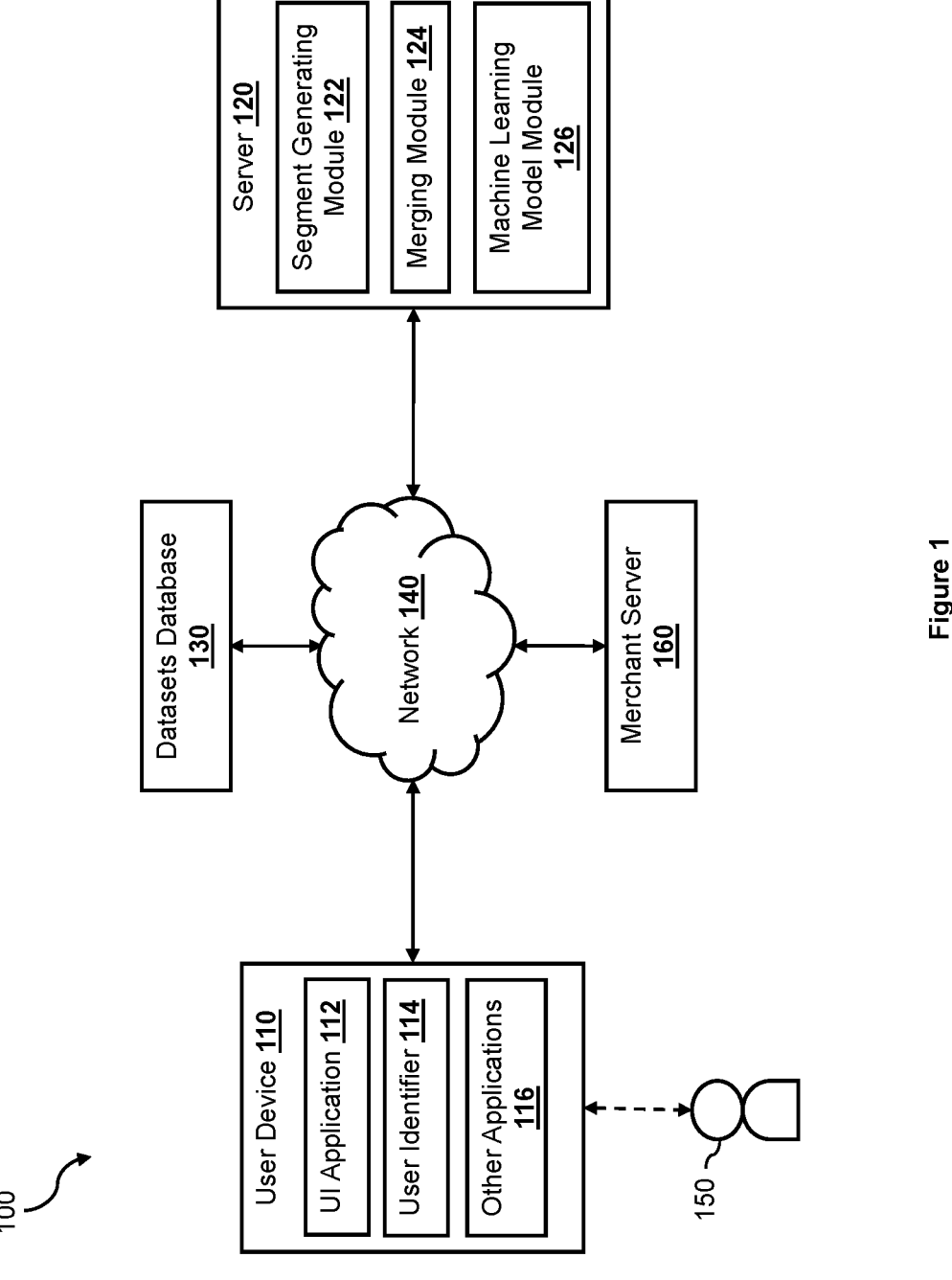
FIG. 1 is a block diagram illustrating an exemplary text library building system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for establishing a text library for a machine learning model. As discussed above, when the input text is longer than a maximum length that a machine learning model can ingest, the input text has to be chunked or split into several chunks that are under the maximum length, so that the machine learning model can process the input text to generate a corresponding output. However, when a chunk is divided from the input text by the maximum length (e.g., the existing solutions like BERT, GPT, and ChunkSumm), the context of the input text might be misinterpreted by the machine learning model. Furthermore, in the scenario that the input text includes two or more languages (e.g., the user might switch languages in the middle of inputting text during a client-agent interaction), this kind of mixed-language input text may be difficult for a machine learning model to generate accurate predictions as the language in the input text fails to match the set source language, which may further compromise downstream applications (e.g., intent prediction, summarization, entity extraction, sentiment analysis, smart replies, etc.) which are dependent on the predictions from the machine learning model for an input. An integration with a downstream application when feeding the chunked data (e.g., chunked texts) to the downstream application may be sequential or parallelized consumption of chunked data based on requirements of the downstream application. For example, when the machine learning model is trained and built based on input texts in English, if there is an input text in Latin (or a chunk of the input text in a different language), the machine learning model could process the input text incorrectly (e.g., "sex" in Latin means the number of six, and the machine learning model may interpret the context of the input text wrong because "sex" in English means gender), such that the machine learning model may generate a wrong prediction. Similar mixed-language inputs, e.g., a input text in Singlish, may easily confuse the machine learning model and compromise the outputs over time.

Nowadays, over one million transcript records are processed by a machine learning model to perform a specific task on a daily basis, a lot of the transcript records are in non-English or mixed language, such that the present method may be used to process these transcript records (e.g., detecting its language, splitting text in the transcript record logically, etc.) may be beneficial before feeding them to a machine learning model (e.g., a translation algorithm). In addition, since there is no one single library to support logical text chunking, especially no single library supporting mixed-language text chunking, when a user needs to process specific input data for a corresponding machine learning model (e.g., a input text that exceeds the limitation of the machine learning model), the user has to write a chunking logic that can properly chunk the specific input data to ensure that the processed input data preserves the most context for the task that the machine learning model is designed for. In such case, writing a customized chunking logic for each machine learning model may waste computer resources to compute the logic and take up computer storage that lowers computing efficiency.

In order to provide a text library that may preserve context of an input text and provide an identified language for a machine learning model, a system for chunking an input text by splitting a text based on its characteristics into one or more segments and merging the segments as a chunk with an identified language is provided. For example, a chunked input text may include several chunks (e.g., a segment or a merged segments combining two or more segments), and each chunk may include a number of words, phrases, or sentences that may composite texts in the original input text. In some embodiments, a sentence may include a complete sentence (e.g., a sentence ended with a period, semicolon, exclamation point, or a question mark) and/or at least a word or a phrase. The system may receive an input text comprising at least one language, and identify the language (e.g., the source language) in the input text. The system may determine a maximum length for generating the segment in response to the identified language, and also identify a set of characteristics of the input text based on the identified language, in order to split the input text into a group of segments efficiently and logically. For example, the system may divide the input text into several sentences (e.g., segments) based on a period or semicolon, which may be considered as a logical break point to preserve the most context in the language of English. In some embodiments, the system may further divide the segment based on another characteristic (e.g., a coordinating conjunction) if the segment is still longer than the maximum length.

Furthermore, the system may merge the segments sequentially to generate a chunk for the input text and detect the language for the merged chunk before feeding the chunk to a machine learning model, such that the output text (e.g., a future input text for the machine learning model) including the chunks may retain the most context and indicate the language in a specific chunk when there is a different language (e.g., a language different from the source language) used in the input text for the machine learning model. As a result, compared to the current solutions which provide low efficient input data (e.g., the machine learning model might need more time to fetch other data associated with the input text to understand the context of the input text, if the input text is being chunked inappropriately by a number of character count) for the machine learning models and further compromises the performance, the machine learning model may receive a logically-chunked text, and each chunk therein does not exceed character limits and preserves sufficient context with the indicated language to accurately output predictions. Therefore, the system may provide a text library that provides a unified chunking approach (e.g., dividing the input text based on the characteristics of the text), and supports input data in multiple languages (e.g., each chunk is specified with the detected language), so that the machine learning model may ensure a consistent and accurate output, and reduce processing time to locate cross-chunk information to retain enough context to provide an accurate output.

As discussed above, by utilizing the approaches including splitting segments for an input text and merging segments as a chunk that is under a maximum length and with a detected language, the system for establishing a multilingual context-preserving text library may apply to many use cases. In some embodiments, the system may support processing an input text in two or more languages for a machine learning model to consistently generate accurate outputs. The system may support multiple languages, such as English, Chinese, Spanish, French, German, Portuguese, Japanese, Italian, Dutch, Russian, Swedish, Polish, Norwegian, Finnish, Danish, Vietnamese, Hindi, Indonesian, Turkish, Hebrew, Thai, Arabic, etc. In some embodiments, the system may be used in a translation service, e.g., translating a document that exceeds a maximum length to multiple languages. In some embodiments, the system may be used in processing/translating a real-time user generated content during a customer-agent interaction (e.g., a chatbot) or a customer-customer interaction during a call to multiple languages efficiently by retaining maximum context from the input. In some embodiments, the system may be used in a speech-to-Text (STT) application. The system may divide a longer transcript in multiple languages to one or more smaller chunks that may be applied to other downstream applications. For example, some users might use their user device to input an audio input via the application on their user device, e.g., requesting a navigation via an audio input when they are driving. The system may convert the audio input into a text input (e.g., a transcript based on the audio input), chunk the text input logically into chunks that are under the maximum length limit and preserve the context of the audio input, and feed the chunks to a navigation application (e.g., a downstream application) for processing the request of navigation.

In some embodiments, the system may be used in a machine learning model or a non-machine learning model. For example, when a machine learning model receives an ill-formed query including text in multiple languages which leads to incorrect search results in a search system, the system may divide the query into smaller chunks, perform language detection on each chunk, translate the chunk not matching the set language to the set language, and then return the concatenated query (e.g., the chunked text in the query) in the correct language to the search system to improve the overall quality of search results. In some embodiments, the system may improve computer performance (e.g., reducing high latency) by parallelizing requests using each chunk as separate inputs to optimize services requested by the requests. In some embodiments, the system may be used in supporting audio data. The system may divide the audio data into smaller chunks, run language detection on each of the chunks to ensure that the language in each chunk can be identified correctly, before sending the audio data to a downstream application. For example, a user may provide an audio input to their user device while using a website or a client application, such as, for example, a merchant application, a particular subscription service application, an e-commerce platform, or a single client application that combines multiple functionalities, such as, for example, but not limited to those described above (e.g., merchant, subscription service, e-commerce, etc.). For example, the user may provide an audio input to request browsing a specific deal or a category of products on the client application or website. The system may convert the audio input into a transcription, and chunk (e.g., splitting and merging) text in the transcription into multiple smaller chunks to be fed into a machine learning model associated with the website or client application, so that the server associated with the particular website or client application may accurately process the request received from the user.

FIG. 1 illustrates an exemplary machine learning system 100, within which a method for establishing a multilingual context-preserving chunk library may be implemented according to some embodiments of the disclosure. The machine learning system 100 includes a user device 110, a server 120, a datasets database 130, and a merchant server 160 that may be communicatively coupled with each other via a network 140. The datasets database 130, in one embodiment, may be a database storing a plurality of input texts for various machine learning models (e.g., natural language processing models including summarization, sentiment analysis, etc., and computer vision (CV) models including optical character recognition (OCR) and object detection) for performing certain tasks (e.g., analyzing a request textually and generating a corresponding response to the request, etc.) which are accessible by the server 120. The network 140, in one embodiment, may be implemented as a single network or a combination of multiple networks. For example, in various embodiments, the network 140 may include the internet and/or one or more intranets, landline networks, wireless networks, and/or other appropriate types of communication networks. In another example, the network 140 may comprise a wireless telecommunications network (e.g., cellular phone network) adapted to communicate with other communication networks, such as the Internet.

The user device 110, in one embodiment, may include a user interface (UI) application 112 (e.g., a web browser, a mobile payment application, a downstream application, etc.), which may be utilized by a user 150 to interact with the server 120 over the network 140. In one implementation, the user interface application 112 may include a software program (e.g., a mobile application) that provides a graphical user interface (GUI) for the user 150 to interface and communicate with the server 120 via the network 140. In another implementation, the user interface application 112 may include a browser module that provides a network interface to browse information available over the network 140. For example, the user interface application 112 may be implemented, in part, as a web browser to view information available over the network 140. Thus, the user 150 may use the user interface application 112 to initiate electronic transactions (e.g., login transactions, data access transactions, profile establishment, etc.) with the server 120 and/or the merchant server 160.

For example, the user 150 may, via the user device 110, log into their account and request a transaction (e.g., making a payment) via the merchant server 160. The merchant server 160 may determine a set of data associated with the transaction, such as data provided by the user 150 via the user device 110, data associated with the user device 110, and data associated with the user 150, and send the gathered data to the server 120 to be parsed and evaluated. For example, the segment generating module 122 and the merging module 124 of the server 120 may textually parse contents in the data associated with the transaction (e.g., an account number, the amount of the payment, a transaction history associated with the user device 110, an IP address of the user device 110, etc.) and generate a chunked content for the data associated with the transaction for the machine learning model module 126 as an input (e.g., information of an account number in a first chunk, information of the amount of the payment in a second chunk, information, and each historical transaction associated with the user device 110 in an individual chunk). In some embodiments, the machine learning model module 126 may be implemented with a machine learning model trained and built to perform a specific task (e.g., evaluating a risk of a transaction). The machine learning model module 126 may receive the input which is chunked by the segment generating module 122 and the merging module 124 and generate an output based on the input. For example, each chunk in the input may be sent to the machine learning model one by one, in which each chunk may include a complete, logical information of a corresponding feature of the transaction (e.g., the number of the account number is not being chunked into two separate chunks that might cause the machine learning model to output an inaccurate prediction), such that the machine learning model may efficiently and accurately process the input. The server 120 may then send the output to the merchant server 160 to proceed with a corresponding action based on the output, e.g., declining the transaction, approving the transaction, or taking additional authentication steps based on the output risk evaluation.

The user device 110 may include other applications 116 as may be desired in one or more embodiments of the present disclosure to provide additional features available to the user 150. In one example, such other applications 116 may include security applications for implementing client-side security features, programmatic client applications for interfacing with appropriate application programming interfaces (APIs) over the network 140, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the server 120 via the network 140, and the identifier 114 may be used by the server 120 to associate the user 150 with a particular user account (e.g., and a particular profile).

In various implementations, the user 150 may be able to input data and information into an input component (e.g., a keyboard) of the user device 110. For example, the user 150 may use the input component to interact with the UI application 112 (e.g., to conduct a purchase transaction via the merchant server 160 and/or the server 120).

The datasets database 130 may store one or more datasets, for example, including training datasets for training various machine learning models maintained by the server 120. The various machine learning models may be trained and built by the server 120, and may be used by the server 120 for performing various tasks. For example, the datasets database 130 may store the datasets associated with a user profile of the user 150 to analyze recurring patterns in transactions made by the user 150, so that the server 120 may generate a recommended content related to the transactions to the user 150 via the user device 110. In some embodiments, the datasets in the datasets database 130 may be graph data, textual data, image data, audio data, and/or sensor data. In some embodiments, the datasets may be in a formality of text. For example, the dataset may include an article drafted by the user 150 which introduces camping gears for backpacking. In some embodiments, the textual data may include sentiment analysis, entity extraction, etc. The textual data may be applied to various platform (e.g., PayPal's natural language artificial intelligence (NLAI) platforms) for better understanding customer sentiment and optimizing the entire support/resolution process. In some embodiments, the images/visual data may be applied to computer vision-related applications, such as OCR and object detection, to process documents (e.g., read texts in a document) uploaded by the user(s) 150, and to automatically extract information from the documents for a faster processing. In some embodiments, the graph data may be utilized by a recommendation system (e.g., PayPal's search system) to generate better search results based on the user's (e.g., the user 150) past search history. In some embodiments, the audio data may be utilized by a speech-to-text system (e.g., PayPal's Speech-to-Text System) to automatically convert conversations between users (e.g., the user 150) and agents (e.g., a customer service agent) to text for a post-call analytics.

The segment generating module 122 and the merging module 124 at the server 120 may retrieve the dataset and parse the text in the dataset, and generate chunked input text based on the text in the dataset (e.g., a chunk may include a paragraph introducing a tent, and another chunk may include a text introducing stove gears). The machine learning model module 126 at the server 120 may apply the chunked input text to a machine learning model for analyzing a specific frequently-appeared topic, and output a recommended content to the user 150.

The merchant server 160, in various embodiments, may be maintained by a business entity (or in some cases, by a partner of a business entity that processes transactions on behalf of the business entity). Examples of business entities include merchants, resource information providers, utility providers, online retailers, real estate management providers, social networking platforms, subscription services, a cryptocurrency brokerage platform, etc., which offer various items, services, and content for purchase and process payments for the purchases. The merchant server 160 may include a merchant database for identifying available items or services, which may be made available to the user device 110 for viewing and purchase by the respective users.

The merchant server 160, in one embodiment, may include a merchant application, which may be configured to provide information over the network 140 to the user interface application 112 of the user device 110. In one embodiment, the merchant application may include a web server that hosts a merchant website for the merchant. For example, the user 150 of the user device 110 may interact with the merchant application through the user interface application 112 over the network 140 to search and view various items or services available for purchase in the merchant database. While only one merchant server 160 is shown in FIG. 1, it has been contemplated that multiple merchant servers, each associated with a different merchant, may be connected to the user device 110 and the server 120 via the network 140.

The server 120, in various embodiments, may be any of various types of computer servers, e.g., a cluster of computers in a server farm, capable of serving data to other computing devices, including user device 110, via network 140. The server 120 may be associated with different types of entities or systems, such as, but not limited to, various service providers, including payment or transaction service providers. In some embodiments, the server 120 may include a segment generating module 122, a merging module 124, and a machine learning model module 126.

Upon receiving an input text (e.g., a request for translating a paragraph) from the datasets database 130 or from the user 150 via the user device 110, the segment generating module 122 may identify a language used in the input text. For example, the segment generating module 122 may tokenize the sentences/words of the input text in different languages with different kinds of tokens, e.g., differentiating tokens based on different languages. In some embodiments, the input text may be in one language which is specifiable by at least one of the user 150, the user device 110, or the merchant server 160. In some embodiments, the input text may be in two or more languages which are specifiable by at least one of the user 150, the user device 110, or the merchant server 160. In some embodiments, the input text may be in one language which is not specifiable by at least one of the user 150, the user device 110, or the merchant server 160. In some embodiments, the input text may be in two or more languages which are not specifiable by at least one of the user 150, the user device 110, or the merchant server 160. In this example, the segment generating module 122 may firstly identify the language(s) used in an input text that is either not specifiable or is specifiable but in two or more languages. When the language(s) used in the input data is identified, the segment generating module 122 may determine a proper maximum length for a segment that is going to be chunked from the input text based on the identified language. For example, in terms of linguistics, a sentence in English may normally include more characters compared with a sentence in Chinese, such that the segment generating module 122 may set a higher maximum length for an input text in English than an input text in Chinese, such that the segment generating module 122 may chunk the input text in English in a much more logistical way, e.g., avoiding chunking a segment that breaks up a complete sentence due to a limited maximum length, to preserve the most context of the input text.

Furthermore, the segment generating module 122 may identify a set of characteristics for generating a segment from the input text. For example, the set of characteristics may be determined based on the linguistic features that may be usable or helpful to chunk a segment logistically. In some embodiments, the set of characteristics may be determined based on the identified language, e.g., a specific term or phrase that indicates an ending of a sentence. In some embodiments, the set of characteristics may include a word count, a conjunction, a punctuation, a character count, and the like.

Based on the determined maximum length and the determined set of characteristics for generating a segment, the segment generating module 122 may divide the input text into one or more segments that include characters less than the maximum length and are divided on one characteristic of the set of characteristics. The segment generating module 122 may then send the segments to the merging module 124 for generating a chunked input for the input text.

Upon receiving the segments divided from the input text, the merging module 124 may merge the segments one by one based on a character number of the segments to be merged. For example, the merging module 124 may merge the first segment and the second segment as a chunk to the chunked input when the character number of the first segment and the second segment is under the maximum length. Therefore, when the chunk of the input text is being fed to the machine learning model module 126, the machine learning model implemented therein may improve its efficiency (e.g., less chunks to read). In some embodiments, the merging module 124 may add the first segment as a chunk to the chunked input when the character number of the first segment and the second segment meets or exceeds the maximum length. The merging module 124 may keep adding a segment and/or a merged segment as a chunk, that is under and yet close to the maximum length, to the chunked input until all the segments have been added to the chunked input, such that the chunked input may preserve the most context from the input text and improve the efficiency of computer performance (e.g., reducing processing time by merging the segments) of the server 120 and/or a downstream application. After all the segments have been merged and added as chunks, the merging module 124 may send the chunked input including the chunks to the machine learning model module 126.

The machine learning model module 126 may receive the chunked input chunk by chunk, e.g., receiving each chunk sequentially, such that the machine learning model implemented in the machine learning model module 126 may process each chunk efficiently (e.g., because each chunk includes characters less than the maximum), and yet receive an entire chunked input eventually to generate an accurate output since the chunked input includes the entire text from the input text and is chunked logistically. For example, a chunked text received by a machine learning model may normally be tokenized, e.g., converted into tokens that the machine learning model can understand. These tokens may then be inputted to the machine learning model for inference where the machine learning model performs required function, such as if the machine learning model performs sentiment prediction, the machine learning model may predict the sentiment (including negative/positive/neutral, e.g., a prediction score) for that chunked text based on tokenized input. The machine learning model may then convert the output (e.g., the prediction score) to a label or a text that the user 150 may understand.

Figure 2:
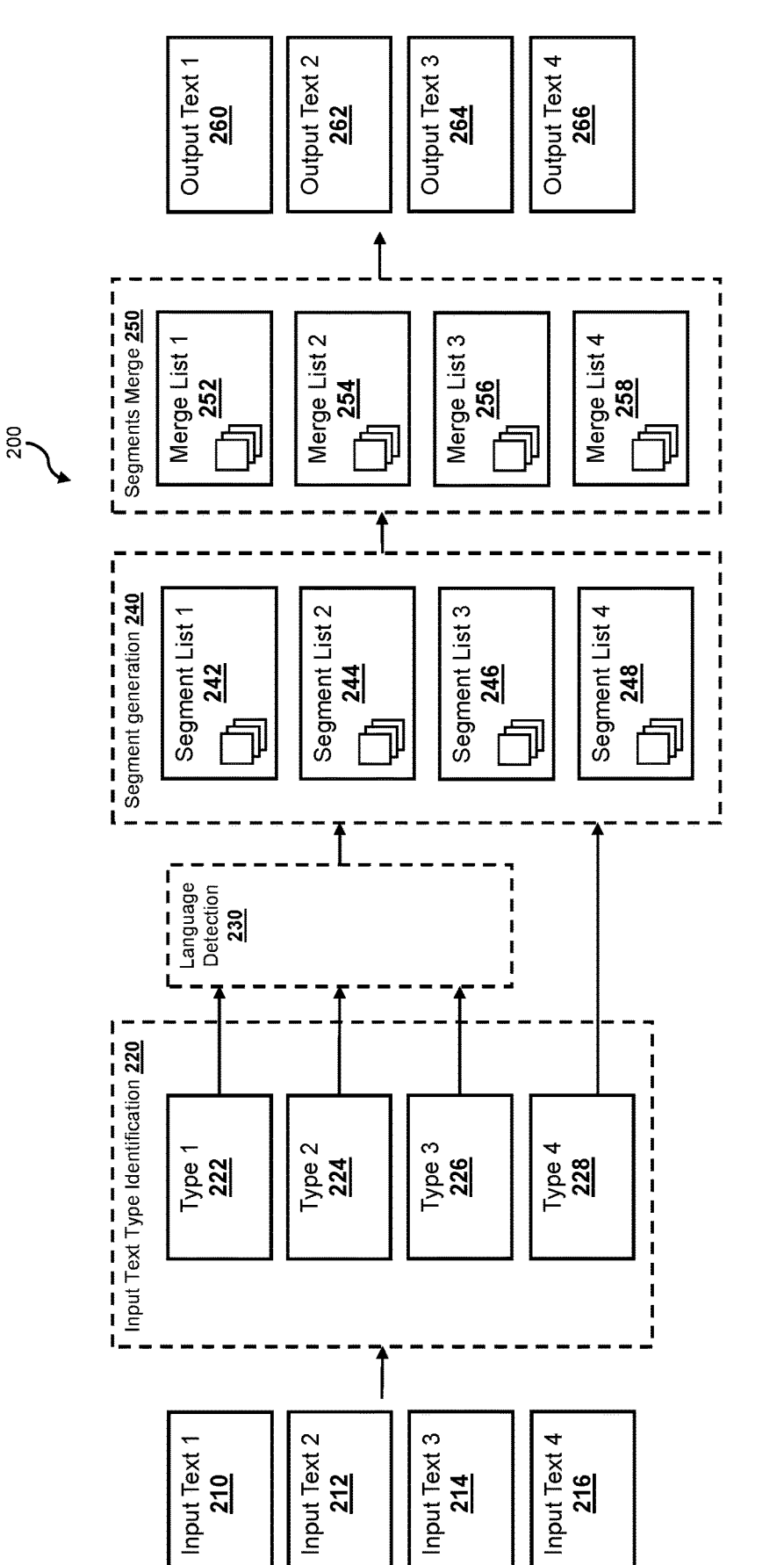
FIG. 2 illustrates an exemplary data flow for generating a text library according to an embodiment of the present disclosure.

FIG. 2 illustrates an exemplary data flow 200 for generating a chunked input text for a machine learning model according to various embodiments of the disclosure. In some embodiments, the exemplary data flow 200 may be performed by the segment generating module 122 and the merging module 124 at the server 120 (as shown in FIG. 1). In a process of generating the chunked input text, the segment generating module 122 may receive an input text, e.g., an input text 1 210, an input text 2 212, an input text 3 214, and an input text 4 216, that may include at least one sentence from the user device 110 and/or the datasets database 130 (shown in FIG. 1). For example, the user 150 may input a request (e.g., a request to reset a password, a request including key words to search a product recommendation) using the user device 110, and send the request to server 120 in a form of a text or a voice message via the network 140. In some embodiments, the voice message may be translated into a transcription (e.g., the form of a text). In some embodiments, the user 150 may send the request to the merchant server 160, and the merchant server 160 may forward the request to the server 120, so that the server 120 may process the request.

The segment generating module 122 of the server 120 may perform input text type identification 220 for the input text (e.g., the input text 1 210, the input text 2 212, the input text 3 214, and the input text 4 216). For example, the segment generating module 122 may identify a type of the input text in terms of language used in the input text. In some embodiment, the segment generating module 122 may categorize the input text into one of four types. Type 1 222 and Type 2 224 may be the types that the language is not specifiable, e.g., the language used in the input text is not specified by the user 150 or the merchant server 160. In some embodiments, Type 1 222 may be a type that includes one language in the input text. In some embodiments, Type 2 224 may be a type that includes two or more languages in the input text. Type 3 226 and Type 4 228 may be the types that the language is specifiable by the user 150 or by the merchant server 160, e.g., the language used in the input text is specified. For example, the user 150 may use the UI application 112 (e.g., a web browser) that may have a default source language to input the input text, such that the input text may be specified with the source language. In some embodiments, the user 150 may specify the language for the input text, e.g., the web browser may have an option to ask the user 150 to select a language before browsing a web site. In some embodiments, Type 3 226 may be a type that includes two or more languages in the input text. In some embodiments, Type 4 228 may be a type that includes one language in the input text. For example, the segment generating module 122 may identify the input text 1 210 as Type 1 222, which means that the input text 1 210 may include one language that is not specifiable. The segment generating module 122 may identify the input text 2 212 as Type 2 224, which means that the input text 2 212 may include two or more languages that are not specifiable. The segment generating module 122 may identify the input text 3 214 as Type 3, which means that the input text 3 214 may include two or more languages that are specifiable, e.g., the input text 3 may be in English and French. The segment generating module 122 may identify the input text 4 216 as Type 4, which means that the input text 4 216 may include one language that is specifiable, e.g., the input text 4 may be in English which is specified by the user 150. In some embodiments, a specifiable language may be a language (e.g., a source language) specified by the user 150, the server 120, and/or the merchant server 160.

The segment generating module 122 may then perform language detection 230 for an input text that has been identified as at least one of Type 1 222, Type 2 224, Type 3 226, or Type 4 228. In some embodiments, the segment generating module 122 may not need to detect a language used in a Type 4 input text (e.g., the input text 4 216), because a Type 4 input text includes only one language and the language may be specified (e.g., by the user 150, the server 120, and/or the merchant server 160). For example, the segment generating module 122 may identify a language used in the input text 1 210 (e.g., the input text 1 210 is identified as Type 1 222, in which the language used in the input text 1 210 is not specifiable). The segment generating module 122 may identify two or more languages used in input text 2 212 (e.g., the input text 2 212 is identified as Type 2 224, in which the languages used in the input text 2 212 are not specifiable). The segment generating module 122 may identify two or more languages used in the input text 3 214 (e.g., the input text 3 214 is identified as Type 3 226, in which the languages used in the input text 2 212 are specifiable). For example, the segment generating module 122 may identify the source language and a second language used in the input text 3 214, e.g., the input text 3 214 may be input via the UI application 112 which has a default source language, English, however, the user 150 might input a term in Chinese in the middle of the input text 3 214. After the language(s) used in the input text has been detected, the segment generating module 122 may perform segment generation 240 for the input text. In some embodiments, the segment generating module 122 may split input based on language when performing language detection 230 and identify each language-specific chunk as a separate input before a further processing, so that the language used in each input may be considered as the source language and the segment generating module 122 may ensure that there are no mixed languages in final chunked outputs, since most of downstream applications using machine learning models cannot process mixed language inputs accurately nor efficiently. In some embodiments, the segment generating module 122 may detect an input text (e.g., detecting language used in the input text) around 0.1 milliseconds on average.

The segment generating module 122 may determine a maximum length for a segment based on the detected language(s). In some embodiments, the segment generating module 122 may rely on a downstream application (e.g., a maximum input length that the downstream application can take) to provide the maximum length for generating the segment. The maximum length may depend on a machine learning model or a specific use-case. For example, the segment generating module 122 may determine a relatively higher maximum length for a segment for the input text in English, because the segment generating module 122 may identify that an input text in English statistically may show a lower rate of being input in mixed languages, or linguistically a sentence in English may need more characters to complete. Based on the detected language(s), the segment generating module 122 may determine a set of characteristics usable for parsing the input text to generate the segments from the input text. For example, for an input text in Korean and/or Japanese, a punctuation may not often be identified in an informal text, such that the segment generating module 122 may identify an ending term as one of the characteristics that is usable for parsing an input text logistically and contextually. By determining maximum length and identifying characteristics for processing the input text, the system 100 may ensure that an output text may preserve the most context from the input text for a machine learning model to generate an accurate prediction more efficiently.

The segment generating module 122 may then derive one or more segments from the input text based on the identified maximum length and characteristics, and generate a segment list including the segment(s). For example, the segment generating module 122 may divide the input text 1 210 into one or more segments, and generate a segment list 1 242 including the segment(s). Likewise, the segment generating module 122 may divide the input text 2 212 into one or more segments, and generate a segment list 2 244 including the segment(s). The segment generating module 122 may divide the input text 3 214 into one or more segments, and generate a segment list 3 246 including the segment(s). The segment generating module 122 may divide the input text 4 216 into one or more segments, and generate a segment list 4 248 including the segment(s). Each segment may be derived from the input text based on one characteristic, and each segment may not exceed the maximum length. The actions and the approaches related to the segment generation 240 will be further described in detail in FIGS. 3-4 and 7.

Based on the segment list, the merging module 124 may perform segments merge 250 to merge the segment(s) in the segment list. For example, the merging module 124 may merge the first segment with the second segment in the segment based on the maximum length, e.g., if a character number of the first segment and the second segment is under the maximum length, the merging module 124 will merge the first segment and the second segment together as a first chunk in the input text. After each segment of the segment list has been merged as a chunk (e.g., merged segments), the merging module 124 may then generate a merge list including the generated chunks. Each chunk may not exceed the maximum length. For example, the merging module 124 may merge the segments derived from the input text 1 210 to form one or more chunks for the input text 1 210, and generate a merge list 1 252 including the one or more chunks. Likewise, the merging module 124 may merge the segments derived from the input text 2 212 to form one or more chunks for the input text 2 212, and generate a merge list 1 254 including the one or more chunks. The merging module 124 may merge the segments derived from the input text 3 214 to form one or more chunks for the input text 3 214, and generate a merge list 3 256 including the one or more chunks. The merging module 124 may merge the segments derived from the input text 4 216 to form one or more chunks for the input text 4 216, and generate a merge list 4 258 including the one or more chunks. The actions and the approaches related to the segments merge 250 will be further described in detail in FIGS. 5-7.

The merging module 124 may then generate an output text based on the merge list the one or more chunks. For example, the output text may include the chunks (e.g., the segments that have been divided and merged based on the characteristics of input text and the maximum length) from the merge list. As discussed above, the merging module 124 may generate an output text 1 260 based on the merge list 1 252 for the input text 1 210. Likewise, the merging module 124 may generate an output text 2 262 based on the merge list 2 254 for the input text 2 212. The merging module 124 may generate an output text 3 264 based on the merge list 3 256 for the input text 3 214. The merging module 124 may generate an output text 4 266 based on the merge list 4 258 for the input text 4 216. When the output text that is prepared by the segment generating module 122 and the merging module 124 is fed to a machine learning model as an input (e.g., a training input), each chunk may be fed to the machine learning model sequentially to improve the efficiency of processing the input (e.g., the output text generated by the segment generating module 122 and the merging module 124).

Figure 3:
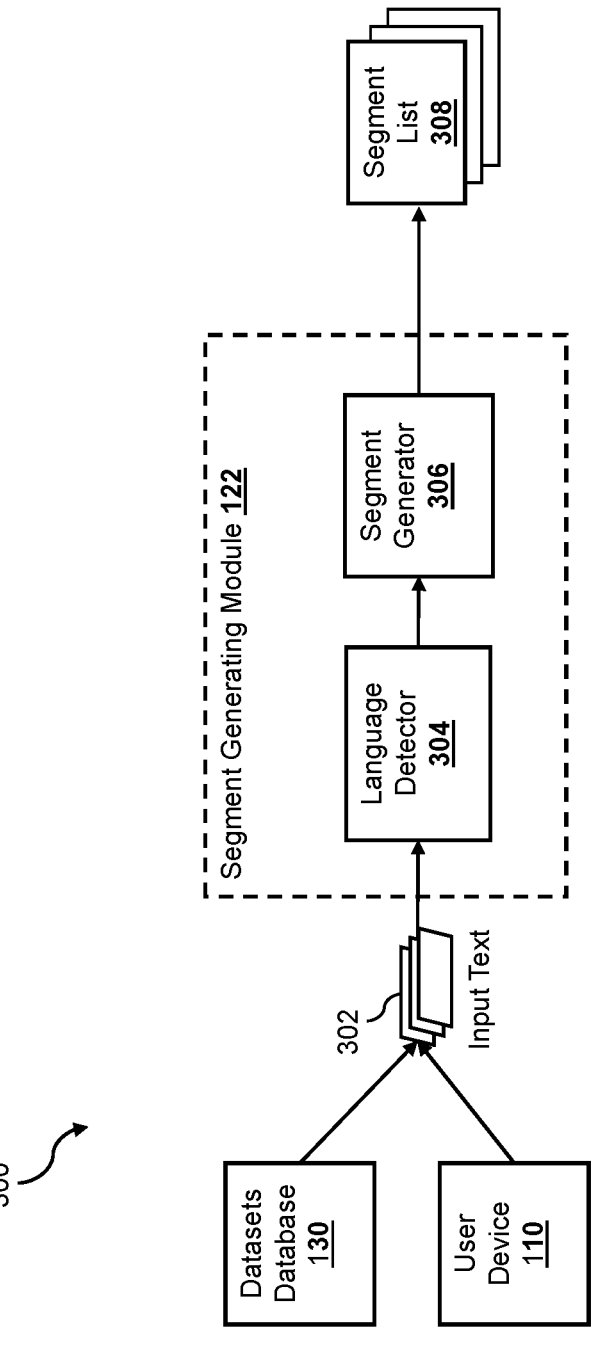
FIG. 3 illustrates an exemplary segment generating module according to an embodiment of the present disclosure.

FIG. 3 illustrates an exemplary implementation 300 of the segment generating module 122 according to various embodiments of the disclosure. As shown, the segment generating module 122 may include a language detector 304 and a segment generator 306. The segment generating module 122 may receive at least one input text 302 (e.g., from the user device 110, from the datasets database 130, etc.). For example, the input text 302 may be a request (e.g., requesting to reset a password or a request including key words to search a product recommendation) sent from the user device 110 by the user 150. In some embodiments, the input text 302 may be training data for a machine learning model to perform a specific task (e.g., providing an answer in response to receiving a question). In this example, the segment generating module 122 may process the input text 302 for the machine learning model in order to improve the accuracy and efficiency of the machine learning model.

The language detector 304 may identify the language used in the input text 302. In this example, there are several types in terms of the language used in the input text that the language detector 304 may classify the input text with. In some embodiments, the system 100 may include, but is not limited to, four types to describe the language used in an input text: (1) single language used in an input text, and the language is specifiable, (2) single language used in an input text, and the language is not specifiable, (3) two or more languages used in an input text, and the languages are specifiable, and (4) two or more languages used in an input text, and the languages are not specifiable. In some embodiments, a specifiable language may be a language specified by the user 150, the server 120, and/or the merchant server 160, and a non-specifiable language may be a language used in an input text and has not been identified by the user 150, the server 120, and/or the merchant server 160. The language detector 304 may identify the input text 302 as one of the types, for example, the language detector 304 may identify that there is only one language used in the input text 302, and the language is specified by the user 150 while inputting the input text 302 via the UI application 112 (e.g., a downstream app using a machine learning model in the backend), and then classify the input text 302 as the first type of input text (e.g., single language used in an input text, and the language is specifiable). In such an example, the language detector 304 may send the first type of the input text 302 to the segment generator 306 for a next process. In other examples, the language detector 304 may identify the input text 302 as one of the second, third, and fourth types, e.g., single, not specifiable language used in an input text, two or more, specifiable languages used, or two or more, not specifiable languages used in an input text. In this example, the language detector 304 may detect a language(s) for the input text 302 that is classified with the second, third, or fourth type.

The language detector 304 may send the input text 302 with a specifiable language(s) (e.g., the specified source language and/or the detected source language) to the segment generator 306. Based on the specifiable language, the segment generator 306 may determine a maximum length for generating/chunking a segment from the input text 302 by analyzing a semantic analysis of the specifiable language and recurring patterns shown in input texts in the specifiable language. For example, the segment generator 306 may determine the maximum length based on statistics and linguistical features of the language. For example, for the language of Chinese, a statistic based on analyzing a pattern of input texts in Chinese may indicate a common pattern that an input text in Chinese may frequently include a term in a different language. Furthermore, normally an input text in Chinese may include fewer characters in a sentence. Therefore, the segment generator 306 may determine a lower maximum length for generating a segment for the input text in Chinese. By setting a lower maximum length for the segment of the input text in Chinese, the segment generator 306 may generate a segment from the input text that preserves the most context (e.g., avoiding generating a segment that might include the term in the different language) and improves computer processing time (e.g., avoiding requiring the machine learning model to have more layers to process an excessively long segment). In some embodiments, the segment generator 306 may determine a maximum length of 512 for the language of English, determine a maximum length of 256 for the language of Spanish, and maximum length of 128 for the language of French. In some embodiments, the system 100 may build a machine learning model implemented in the segment generator 306 to determine a maximum length for a segment according to a specific language. The machine learning model may be trained and built by input texts that are chunked into different lengths, and monitor its output to determine a proper length for each segment based on an accuracy of the output. In some embodiments, the segment generator 306 may determine a maximum length for a segment based on the input limit of the downstream application, e.g., if the downstream application has a length limit of an input text, the segment generator 306 may set the length limit for generating the segment based on the length limit of the input text for the downstream application to provide the maximum length as input. In some embodiments, because characters in input texts are broken down into tokens (through a process called tokenization in machine learning systems) which are language-independent, the segment generator 306 may apply the same maximum length specified in the input throughout, and may not need different maximum/minimum lengths based on language.

Furthermore, based on the language, the segment generator 306 may determine a set of characteristics for generating the segment from the input text 302. In some embodiments, the segment generator 306 may determine a set of characteristics, including a word count, a conjunction, a punctuation, or a character count, to divide a segment from the input text 302. In some embodiments, the set of characteristics may include more characteristics in response to the language. For example, for the languages that do not often use a punctuation (e.g., Korean and Japanese), the segment generator 306 may include a characteristic that may be beneficial to divide the input text into segments logistically (e.g., an ending term or phrase in Korean or Japanese).

In some embodiments, the segment generator 306 may firstly identify one or more sentences (e.g., a potential segment) based on a period or a question mark. The segment generator 306 may compute a character number for each sentence to determine whether any sentence meets or exceeds the determined maximum length. If a sentence meets or exceeds the maximum length, the segment generator 306 may sequentially use a characteristic in the set of characteristics each time to further divide a sentence that is still longer than the maximum length, so that the character number of the sentence may be under the maximum length. In some embodiments, the segment generator 306 may use a conjunction, a punctuation, and a character number sequentially to generate a segment that is divided logistically and is under the maximum length.

Based on the determined maximum length and the identified set of characteristics, the segment generator 306 may generate a segment list 308 including the one or more segments derived from the input text 302. For example, the segment list 306 may be generated by the same process as the segment lists 242 to 248 disclosed in FIG. 2. The segment generating module 122 may then send the segment list 308 to the merging module 124 for a next process. A further illustration of the actions performed at the segment generating module 122 will be explained in a flow diagram in FIG. 4.

Figure 4:
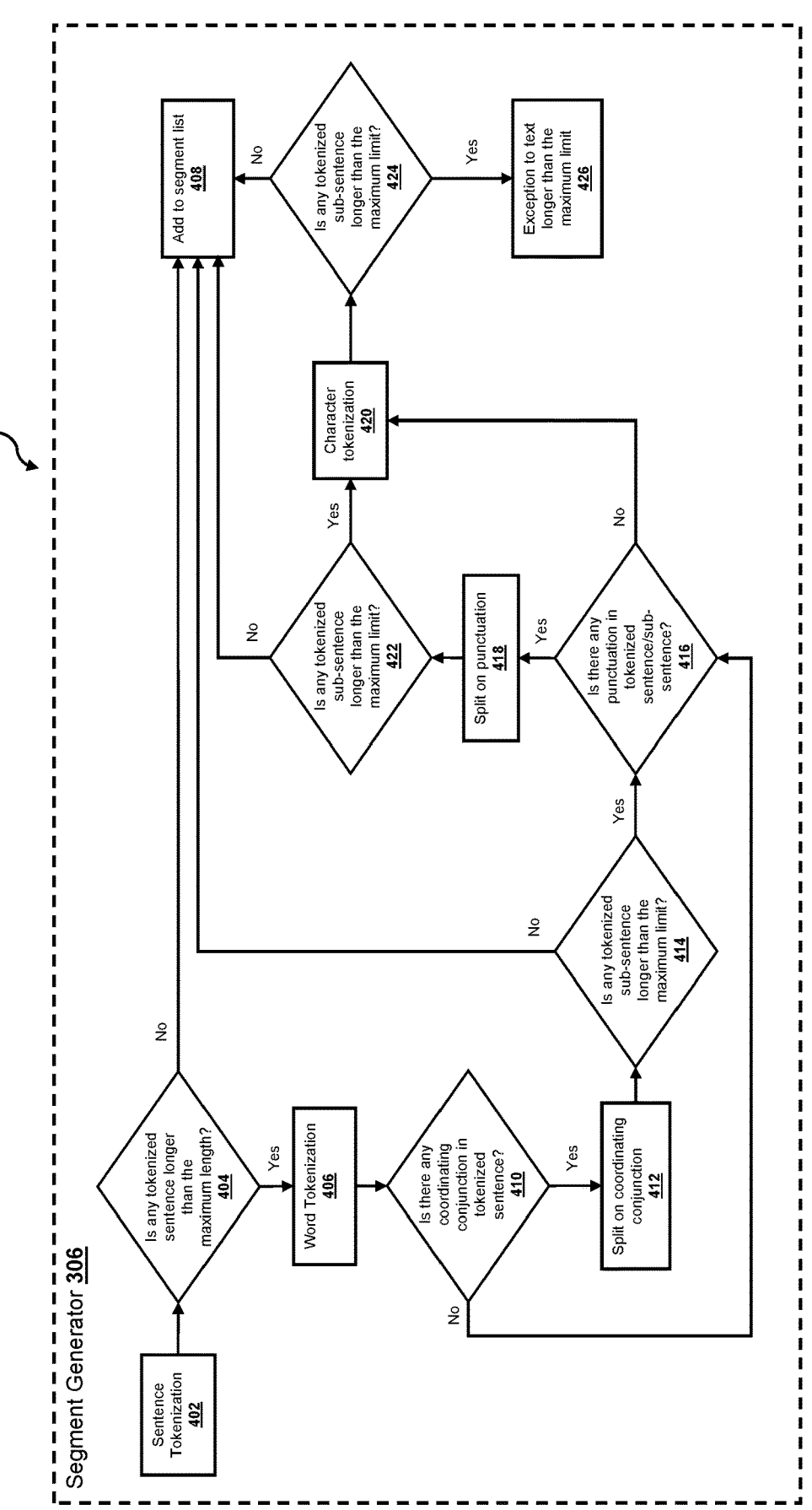
FIG. 4 illustrates an exemplary data flow for generating segments according to an embodiment of the present disclosure.

FIG. 4 illustrates an exemplary process flow 400 for generating segments according to various embodiments of the disclosure. In some embodiments, the process flow 400 may be performed by the segment generator 306. In the process flow 400 of generating segments from the input text 302, the segment generator 306 may receive the input text 302 with specifiable language from the language detector 304 (shown in FIG. 3), and perform a sentence tokenization on the input text 302 at block 402. The segment generator 306 may generate a token for each sentence identified from the input text 302, e.g., a token may be generated by identifying a segment, a representation, a vector, a chunk, or the like from the input text 302 based on words, spaces, phrases, syntax, semantics, and/or punctuation of the input text 302. For example, the segment generator 306 may tokenize one or more sentences in the input text 302 based on a period, semicolon, exclamation point, or a question mark, which are normally used to indicate an ending of a sentence.

At block 404, the segment generator 306 may further determine if there is any tokenized sentence longer than the maximum length (e.g., a maximum length for a segment determined based on the language used in the input text 302 discussed in FIG. 3). For example, the segment generator 306 may compute a length of each of the tokenized sentences generated at block 402, and determine whether any tokenized sentence is longer than the maximum length. In some embodiments, if a length of any of the tokenized sentences is still longer than the maximum length, the process flow 400 may move to block 406 to perform word tokenization on the tokenized sentence that is longer than the maximum length. For example, the segment generator 306 may identify at least one specific word (e.g., a coordinating conjunction) that may be preset for a proper semantic chunking, such that the segment generator 306 may chunk the tokenized sentence into two tokenized sub-sentences based on the identified word (e.g., and). If none of the tokenized sentences is longer than the maximum length, the process flow 400 may move to block 408 to add the tokenized sentences to a segment list (e.g., segment list 308, shown in FIG. 3).

At block 406, the segment generator 306 may perform a word tokenization on the tokenized sentence that is still longer than the maximum length. For example, the segment generator 306 may look for a specific word (e.g., a conjunction) in the input text 302.

At block 410, the segment generator 306 may determine if there is any coordinating conjunction (e.g., and, or, but, for, yet, nor, etc.) in the tokenized sentence. If there is an identified coordinating conjunction in the tokenized sentence, the process flow 400 may move to block 412 to divide/split the tokenized sentence on the identified coordinating conjunction. For example, the segment generator 306 may divide a tokenized sentence "One day the Hare laughed at the short feet and slow speed of the Tortoise." on an identified conjunction "and," and generate two sub-sentences "One day the Hare laughed at the short feet" and "and slow speed of the Tortoise.". If there is no coordinating conjunction identified in the tokenized sentence, the process flow 400 may move to block 416 to further identify a punctuation in the tokenized sentence.

At block 414, the segment generator 306 may determine if there is any tokenized sub-sentence (e.g., sub-sentences generated at block 412) still longer than the maximum length. For example, if a length of any of the tokenized sub-sentences is still longer than the maximum length, the process flow 400 may move to block 416 to look for any punctuation in the tokenized sub-sentence that is longer than the maximum length. For example, the segment generator 306 may look for a comma in the sub-sentence that is longer than the maximum length. If none of the tokenized sub-sentences is longer than the maximum length, the process flow 400 may move to block 408 to add the tokenized sub-sentences to the segment list.

At block 416, the segment generator 306 may determine if there is any punctuation (e.g., comma, semicolon, colon, hyphen, etc.) in the tokenized sub-sentence. If there is an identified punctuation in the tokenized sub-sentence, the process flow 400 may move to block 418 to divide/split the tokenized sub-sentence on the identified punctuation. For example, the segment generator 306 may divide a tokenized sub-sentence "But when he reached the end, he saw the Tortoise there already." on an identified punctuation of a comma, and generate two sub-sentences "But when he reached the end" and ", he saw the Tortoise there already." from the tokenized sub-sentence "But when he reached the end, he saw the Tortoise there already.". If there is no punctuation identified in the tokenized sub-sentence, the process flow 400 may move to block 420 to further perform character tokenization on the tokenized sentence and/or tokenized sub-sentence. For example, the segment generator 306 may compute a character count for a tokenized sentence that is longer than the maximum length, and chunk the tokenized sentence on the character count of the maximum length into two tokenized sub-sentences.

At block 420, the segment generator 306 may determine if there is any tokenized sub-sentence (e.g., sub-sentences generated at block 418) still longer than the maximum length (e.g., computing a number of character count of a sub-sentence to see if the number of character count exceeds the maximum length). For example, if a length of any of the tokenized sub-sentences is still longer than the maximum length, the process flow 400 may move to block 420 to perform the character tokenization on the tokenized sub-sentence. If none of the tokenized sub-sentences is longer than the maximum length, the process flow 400 may move to block 408 to add the tokenized sub-sentences to the segment list.

At block 422, the segment generator 306 may perform character tokenization on the tokenized sentence and/or tokenized sub-sentence to divide the tokenized sentence and/or tokenized sub-sentence on a character count of the maximum length (e.g., dividing the sub-sentence into two sub-sentences based on the character count of the maximum length). For example, if there is a tokenized sentence that have a character number of 130 when the maximum length is 60, the segment generator 306 may divide the tokenized sentence on the character count of 60, and generate two sub-sentences that one has a character number of 60 and the other one has a character number of 70.

At block 424, the segment generator 306 may determine if there is any tokenized sub-sentence (e.g., sub-sentences generated at block 420) still longer than the maximum length. For example, if a length of any of the tokenized sub-sentences is still longer than the maximum length, the process flow 400 may move to block 426 to an exception to a text (e.g., a sub-sentence generated at block 420) that is longer than the maximum length. In some embodiments, the segment generator 306 may consider the exception at block 416 as a check point (e.g., checking the length of a sub-sentence) in case any of the logic before block 426 fails. If there is a failure of the logic happened, the segment generator 306 may run character tokenization again (e.g., checking the length of each sub-sentence) to ensure that all sub-sentences (e.g., segments) are shorter than the maximum length. If none of the tokenized sub-sentences is longer than the maximum length, the process flow 400 may move to block 408 to add the tokenized sub-sentences to the segment list.

At block 408, the segment generator 306 may generate the segment list 308 by adding every tokenized sentence and tokenized sub-sentence generated from blocks 406, 412, 418, and 420 (e.g., segments derived from the input text 302), and then send the segment list 308 to the merging module 124 for a next process.

Figure 5:
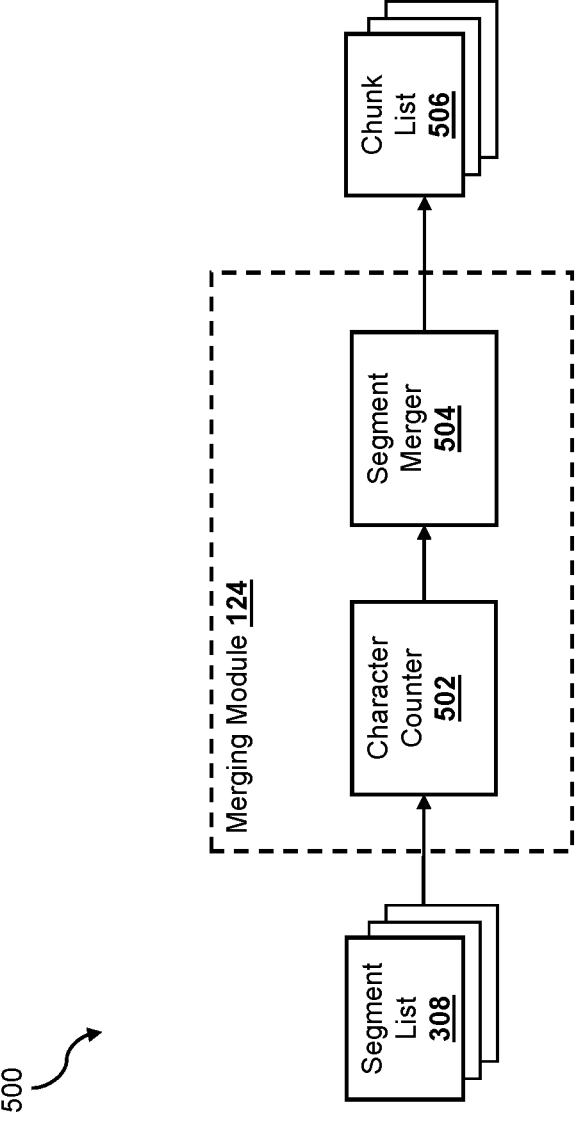
FIG. 5 illustrates an exemplary merging module according to an embodiment of the present disclosure.

FIG. 5 illustrates an exemplary implementation 500 of the merging module 124 (shown in FIG. 1) according to various embodiments of the disclosure. As shown, the merging module 124 includes a character counter 502 and a segment merger 504. In some embodiments, the character counter 502 may receive the segment list 308 from the segment generator 306 of the segment generating module 122 (both shown in FIG. 3). The character counter 502 may compute a character number of a current segment (e.g., the first segment in the segment list 308) and a next segment (e.g., the second segment in the segment list 308) and determine whether the character number of the current segment and the next segment meets or exceeds the maximum length. If the character number of the current segment and the next segment meets or exceeds the maximum length, the character counter 502 may send the current segment (e.g., the first segment in the segment list 308) to the segment merger 504. The segment merger 504 may add the current segment as a first chunk to a chunk list 506.

The character counter 502 may continuously compute a character number of a current segment (e.g., the second segment in the segment list 308 after the first segment has been added as the first chunk to the chunk list 506) and a next segment (e.g., the third segment in the segment list 308), and the segment merger 504 may append the current segment (e.g., the second segment) as a chunk (e.g., the second chunk), if the character number of the current segment and the next segment meets or exceeds the maximum length, to the chunk list 506 until all the segments in the segment list 308 have been added as a chunk to the chunk list 506.

In some embodiments, the character counter 502 may compute a character number of a current segment (e.g., the third segment in the segment list 308 after the second segment has been added as the second chunk to the chunk list 506) and a next segment (e.g., the fourth segment in the segment list 308), and determine whether the character number of the current segment and the next segment meets or exceeds the maximum length. If the character number of the current segment and the next segment does not exceed the maximum length, the character counter 502 may send the current segment (e.g., the third segment in the segment list 308) and the next segment (e.g., the fourth segment in the segment list 308) to the segment merger 504. The segment merger 504 may merge the current segment and the next segment as a chunk (e.g., the third chunk) to the chunk list 506.

The merging module 124 may generate the chunk list 506 (e.g., the merge lists 252 to 258 disclosed in FIG. 2) that may include the chunks generated by appending or merging the segments in the segment list 308, and output a chunked input based on the chunk list 506 as an input for a machine learning model. For example, the chunked input may include the text in the input text 302 processed by the segment generating module 122 and the merging module 124, resulting in the text in the input text 302 being chunked into one or more chunks. When the chunked input is being fed to the machine learning model, each chunk in the chunked input may be fed one by one sequentially, such that the machine learning model may process each chunk efficiently and predict an accurate output in response to the chunked input because each chunk in the chunked input may be under the maximum length and preserve the most context from the input text.

When the system identifies that most of the input texts in a specific source language may include mixed languages, the system may set up a relative lower maximum input limit. For example, in terms of a Chinese language user, a lot of input texts in Chinese made by the Chinese language user might include some English terms in a Chinese input text, so that the system may set up a lower maximum input limit, e.g., 64, to divide the input text into segments that may preserve the most contexts from the input text. A further illustration of the actions performed at the merging module 124 will be explained in a flow diagram in FIG. 6.

FIG. 6 illustrates an exemplary process flow 600 for merging segments according to various embodiments of the disclosure. In some embodiments, the exemplary process flow 600 may be performed by the merging module 124. In the process flow 600 of merging segments, the merging module 124 may receive the segment list 308 from the segment generating module 122, and determine whether there is more than one segment in the segment list 308 at block 602. In some embodiments, if there is only one segment in the segment list 308, the merging module 124 may add that one segment as a chunk to chunk list 506 (shown in FIG. 5) at block 614. If there are one or more segments in the segment list 308, the merging module 124 may determine a current segment (e.g., the first segment) and a next segment (e.g., the second segment) from the segment list 308 at block 604.

At block 606, the merging module 124 may then determine whether a length (e.g., a character number) of the current segment and the next segment (e.g., the first segment and the second segment determined at block 604) is longer than the maximum length. If the length of the current segment and the next segment is longer than the maximum, the merging module 124 may detect the language used in the current segment at block 610, and add the current segment with the detected language to the chunk list 506 at block 612. In some embodiments, the merging module 124 may determine whether there is still more than one segment in the segment list 308 at block 602 after the current segment (e.g., the first segment) is being added to the chunk list 506. If there is still more than one segment in the segment list 308, the merging module 124 may continuously determine a current segment (e.g., the second segment) and a next segment (e.g., the third segment) from the segment list 308 at block 604. In there is only one segment (e.g., the first segment to be added to the chunk list 506) left in the segment list 308, the merging module 124 may append the segment as a chunk (e.g., the first chunk) to the chunk list 506 at block 614.

In some embodiments, at block 606, the merging module 124 may the determine that the length (e.g., a character number) of the current segment and the next segment (e.g., the first segment and the second segment determined at block 604) is not longer than the maximum length, the merging module 124 may merge the current segment (e.g., the first segment) and the next segment (e.g., the second segment) at block 608, and then add the merged segment as a chunk to the chunk list 506. In some embodiments, the merging module 124 may detect the language for the merged segment (e.g., the current segment and the second segment). In some embodiments, the merging module 124 may determine whether there is still more than one segment in the segment list 308 at block 602 again after the merged segment (e.g., the first segment and the second segment) is being added to the chunk list 506. If there is still more than one segment in the segment list 308, the merging module 124 may continuously determine a current segment (e.g., the third segment) and a next segment (e.g., the fourth segment) from the segment list 308 at block 604. In there is only one segment (e.g., the merged segment to be added to the chunk list 506) left in the segment list 308, the merging module 124 may append the merged segment as a chunk (e.g., the first chunk) to the chunk list 506 at block 614.

After all the segments in the segment list 308 have been added as chunks to the chunk list 506, the merging module 124 may generate an output (e.g., a chunked input for a machine learning model) based on the chunk list 506.

Figure 7:
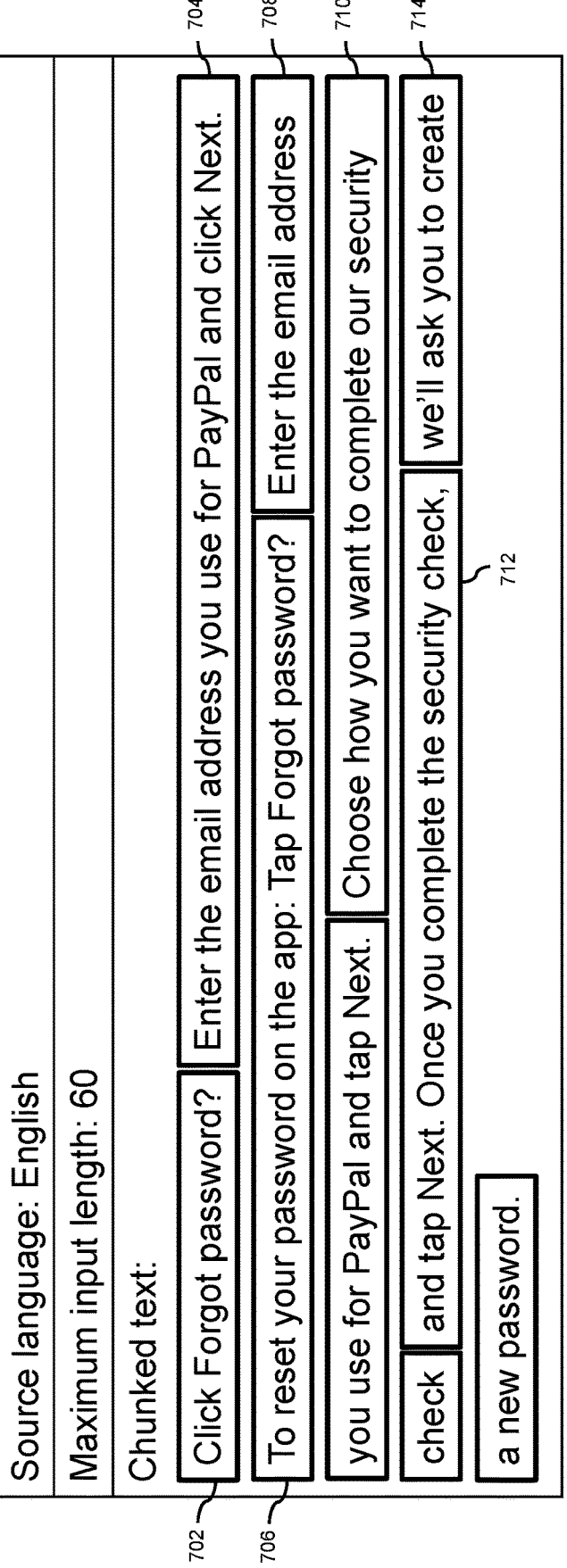
FIG. 7 illustrates an exemplary chunked text according to an embodiment of the present disclosure.

FIG. 7 illustrates an exemplary chunked text 700 according to one embodiment of the disclosure. As shown, the chunked text 700 may include one or more chunks 702, 704, 706, 708, 710, 712, and 714 generated by the system 100 and/or the actions described with respect to FIGS. 2-6. In some embodiments, the chunked text 700 may be specifiable for its source language and its maximum input length for a machine learning model, e.g., English and a maximum input length of 60 shown in FIG. 7. A sample input may be provided to demonstrate how the system 100 may generate the chunked text 700 in detail. The sample input may include a text of "Click Forgot password? Enter the email address you use for PayPal and click Next. To reset your password on the app: Tap Forgot password? Enter the email address you use for PayPal and tap Next. Choose how you want to initialize a sentence tokenizer, a word tokenizer, and a part-of-speech (POS) tagger for English. Then, the segment generating module 122 may perform a sentence tokenization to the sample input, to divide the sample input into tokenized sentences based on English (e.g., the detected language or the specified source language) as the action 406 disclosed in FIG. 4. For the sample input provided above, the segment generating module 122 may tokenize the sample input into:

--- a. Tokenized sentence 1: Click Forgot password?
b. Tokenized sentence 2: Enter the email address you use for PayPal and click Next.
c. Tokenized sentence 3: To reset your password on the app: Tap Forgot password?
d. Tokenized sentence 4: Enter the email address you use for PayPal and tap Next.
e. Tokenized sentence 5: Choose how you want to complete our security check and tap Next.
f. Tokenized sentence 6: Once you complete the security check, we'll ask you to create a new password.

Then, the segment generating module 122 may then compute a length of each of the tokenized sentences:
a. Length of tokenized sentence 1 (Click Forgot password?): 22.
b. Length of tokenized sentence 2 (Enter the email address you use for PayPal and click Next.): 58.
c. Length of tokenized sentence 3 (To reset your password on the app: Tap Forgot password?): 55.
d. Length of tokenized sentence 4 (Enter the email address you use for PayPal and tap Next.): 56.
e. Length of tokenized sentence 5 (Choose how you want to complete our security check and tap Next.): 64.
f. Length of tokenized sentence 6 (Once you complete the security check, we'll ask you to create a new password.): 77.

--- complete our security check and tap Next. Once you complete the security check, we'll ask you to create a new password."

The system 100 may set up a corresponding maximum input length according to each source language. For example, the system 100 may set up a maximum input length of 512 for the language of English, a maximum input length of 256 for the language of Spanish, a maximum input length of 128 for the language of France, and so forth, based on characteristics of the language.

In some embodiments, the system 100 may set up a maximum input length for the sample input for a specific task and/or based on the length of the sample input. In this example, even though the detected language is English (e.g., language detected by the language detection 230 disclosed in FIG. 2 or the language detector 304), the maximum input length is set at 60 based on both the length of the sample input and the task (e.g., create new password because of forgotten password). In some embodiments, the system 100 may detect what language is used in the sample input, if the language (e.g., source language) in the sample input is not specified. In some embodiments, if the system 100 detects two or more languages used in the sample input, the system 100 may divide the sample input into segments according to the languages. For example, the first two sentences in the sample input may be in English and the last two sentences in the sample input may be in Chinese, the system 100 may divide the sample input into two segments based on the detected languages, e.g., one segment including text in the first two sentences in English, and the other segment including text in the last two sentences in Chinese.

After the system 100 confirms the source language for the sample input, which is English in this embodiment, the segment generating module 122 of the system 100 may In some embodiments, if a length of any of the tokenized sentences is still longer than the maximum input length, e.g., 60 for this sample input, the segment generating module 122 may further divide the tokenized sentence that is longer than the maximum input length based on a word tokenization. For example, the tokenized sentences 5 and 6 have lengths greater than 60 (e.g., the length of tokenized sentence 5 is 64 and the length of tokenized sentence is 77, and both lengths exceed the maximum input length). The segment generating module 122 may perform the word tokenization to the tokenized sentences 5 and 6. The segment generating module 122 may look for a conjunction in the tokenized sentences 5 and 6 (e.g., the action 410 disclosed in FIG. 4). For example, the segment generating module 122 may identify a conjunction "and" in the tokenized sentence 5, and then divide the tokenized sentence 5 into two sub-sentences based on the identified conjunction:

--- a. Sub-sentence 1: "Choose how you want to complete our security check"
b. Sub-sentence 2: "and tap Next."

---

As a result, the lengths of sub-sentences 1 and 2 divided from the tokenized sentence 5 are both less than the maximum input length (e.g., 50 and 13). The segment generating module 122 may not perform an additional division for the sub-sentences 1 and 2 of the tokenized sentence 5, e.g., no additional punctuation or character tokenization, such as the actions 416 and 420 disclosed in FIG. 4.

In some embodiments, when the segment generating module 122 cannot identify any conjunction in a tokenized sentence that is longer than the maximum input length, the segment generating module 122 may perform a punctuation identification on the tokenized sentence that is longer than the maximum input length. For example, the segment generating module 122 cannot locate any conjunction in the tokenized sentence 6 "Once you complete the security check, we'll ask you to create a new password.", the segment generating module 122 may then look for a punctuation in the tokenized sentence 6. The segment generating module 122 may identify a punctuation "," in the tokenized sentence 6, and then divide the tokenized sentence 6 into two sub-sentences based on the identified punctuation, such as:

--- a. Sub-sentence 1: "Once you complete the security check,"
b. Sub-sentence 2: "we'll ask you to create a new password."

---

As a result, the lengths of sub-sentences 1 and 2 divided from the tokenized sentence 6 are both less than the maximum input length (e.g., 37 and 39). The system 100 will not perform any additional division for the sub-sentences 1 and 2 of the tokenized sentence 6, e.g., no character tokenization.

Once the lengths of the tokenized sentences and the sub-sentences are all less than the maximum input length (e.g., the action 424 disclosed in FIG. 4), the segment generating module 122 will not further perform a character tokenization for this sample input. The segment generating module 122 may generate a segment list including segments (e.g., the tokenized sentences and the sub-sentences) as the action 408 disclosed in FIG. 4. The segments and their length may include:

--- a. Segment 1 (Click Forgot password?): 22,
b. Segment 2 (Enter the email address you use for PayPal and click Next.): 58,
c. Segment 3 (To reset your password on the app: Tap Forgot password?): 55,
d. Segment 4 (Enter the email address you use for PayPal and tap Next.): 56,
e. Segment 5 (Choose how you want to complete our security check): 50,
f. Segment 6 (and tap Next.): 13,
g. Segment 7 (Once you complete the security check,): 37, and
h. Segment 8 (we'll ask you to create a new password.): 40.

---

The merging module 124 of the system 100 may merge the segments sequentially and append merged segments as a chunk to a chunk list. In some embodiments, the merging module 124 may identify a current segment from the segments in the segment list, and then identify a next segment to be appended to the current segment (e.g., the action 604 disclosed in FIG. 6). If the length of the current segment and the next segment exceeds the maximum input length, the merging module 124 may add the current segment as a chunk to the chunk list (e.g., the action 612 disclosed in FIG. 6). The merging module 124 may append the segments as chunks into the chunk list (e.g., the action 614 disclosed in FIG. 6) until there is no segment left in the segment list.

For example, a length of the segment 1 (e.g., the current segment in the first loop) in the segment list is 22 which is under the maximum input length, the merging module 124 may look into the segment 2 (e.g., the next segment in the first loop) from the segment list, and determine whether a length of the segment 1 and the segment 2 exceeds the maximum input length. The merging module 124 may determine that the length of the segment 1 and the segment 2 exceeds the maximum input length (e.g., 22+58=80, which exceeds the maximum input length of 60). The merging module 124 may then add the segment 1 "Click Forgot password?" (e.g., the current segment) as chunk 1 702 to the chunk list, such that the segment 2 (e.g., the next segment)

in this round may become the current segment in the next round for generating a next chunk.

As discussed above, in the next round, the merging module 124 may identify the length of the segment 2 (e.g., the current segment in the second loop) in the segment list is 58 which is under the maximum input length, the merging module 124 may look into the segment 3 (e.g., the next segment in the second loop) from the segment list, and determine whether a length of the segment 2 and the segment 3 exceeds the maximum input length. The merging module 124 may determine that the length of the segment 2 and the segment 3 exceeds the maximum input length (e.g., 58+55=113, which exceeds the maximum input length of 60). The merging module 124 may then add the segment 2 "Enter the email address you use for PayPal and click Next?" (e.g., the current segment) as chunk 2 704 to the chunk list, such that the segment 3 (e.g., the next segment) in this round may become the current segment in the next round for generating a next chunk.

Likewise, the merging module 124 may identify the length of the segment 3 (e.g., the current segment in the third round) in the segment list is 55 which is under the maximum input length, the merging module 124 may look into the segment 4 (e.g., the next segment in the third round) from the segment list, and determine whether a length of the segment 3 and the segment 4 exceeds the maximum input length. The merging module 124 may determine that the length of the segment 3 and the segment 4 exceeds the maximum input length (e.g., 55+56=111, which exceeds the maximum input length of 60). The merging module 124 may then add the segment 3 "To reset your password on the app: Tap Forgot password?" (e.g., the current segment) as chunk 3 706 to the chunk list, such that the segment 4 (e.g., the next segment) in this round may become the current segment in the next round for generating a next chunk.

Likewise, the merging module 124 may identify the length of the segment 4 (e.g., the current segment in the fourth loop) in the segment list is 56 which is under the maximum input length, the merging module 124 may look into the segment 5 (e.g., the next segment in the fourth loop) from the segment list, and determine whether a length of the segment 4 and the segment 5 exceeds the maximum input length. The merging module 124 may determine that the length of the segment 4 and the segment 5 exceeds the maximum input length (e.g., 56+50=106, which exceeds the maximum input length of 60). The merging module 124 may then add the segment 4 "Enter the email address you use for PayPal and tap Next." (e.g., the current segment) as chunk 4 708 to the chunk list, such that the segment 5 (e.g., the next segment) in this round may become the current segment in the next round for generating a next chunk.

Likewise, the merging module 124 may identify the length of the segment 5 (e.g., the current segment in the fifth loop) in the segment list is 50 which is under the maximum input length, the merging module 124 may look into the segment 6 (e.g., the next segment in the fifth loop) from the segment list, and determine whether a length of the segment 5 and the segment 6 exceeds the maximum input length. The merging module 124 may determine that the length of the segment 5 and the segment 6 exceeds the maximum input length (e.g., 50+13=63, which exceeds the maximum input length of 60). The merging module 124 may then add the segment 5 "Choose how you want to complete our security check" (e.g., the current segment) as chunk 5 710 to the chunk list, such that the segment 6 (e.g., the next segment) in this round may become the current segment in the next round for generating a next chunk.

Furthermore, the merging module 124 may identify the length of the segment 6 (e.g., the current segment in the sixth loop) in the segment list is 13 which is under the maximum input length, the merging module 124 may look into the segment 7 (e.g., the next segment in the sixth loop) from the segment list, and determine whether a length of the segment 6 and the segment 7 exceeds the maximum input length. The merging module 124 may determine that the length of the segment 6 and the segment 7 does not exceed the maximum input length (e.g., 13+37=50, which does not exceed the maximum input length of 60). The merging module 124 may then append the segment 7 "Once you complete the security check," to the segment 6 "and tap Next." as the current segment in the next round for generating a next chunk (e.g., the action 608 disclosed in FIG. 6).

As discussed above, in this round (e.g., the seventh loop) for generating a chunk, the current segment, that is generated from the last round (e.g., the sixth loop), includes "and tap Next. Once you complete the security check," from merging the segments 6 and 7. The merging module 124 may look into the segment 8 (e.g., the next segment in seventh loop) from the segment list, and determine whether a length of the current segment (e.g., the merged segments 6 and 7) and the segment 8 exceeds the maximum input length. The merging module 124 may determine that the length of the current segment and the segment 8 exceeds the maximum input length (e.g., 50+40=90, which exceeds the maximum input length of 60). The merging module 124 may then add the current segment (e.g., the merged segments 6 and 7 "and tap Next. Once you complete the security check,") as chunk 6 710 to the chunk list, such that the segment 8 (e.g., the next segment) in this round may become the current segment in the next round for generating a next chunk.

Eventually, the merging module 124 may add the segment 8 (e.g., the current segment in the eighth loop) as a chunk 7 714 to the chunk list, and complete the chunk list since there is no segment left in the segment list. The merging module 124 may generate a chunk list including a chunked text including the chunks 1 to 7:

'Click Forgot password? (Chunk 1 702)' 'Enter the email address you use for PayPal and click Next (Chunk 2 704)' 'To reset your password on the app: Tap Forgot password? (Chunk 3 706)' 'Enter the email address you use for PayPal and tap Next. (Chunk 4 708)' 'Choose how you want to complete our security check (Chunk 5 710)' 'and tap Next. Once you complete the security check, (Chunk 6 712)' 'we'll ask you to create a new password. (Chunk 7 714)'

The system 100 may then send the chunk list to a machine learning model (e.g., a natural language processing model) for a further processing. In some embodiments, the system 100 may feed each chunk in the chunk list separately and sequentially, in order to make sure that each input for the machine learning model is under the maximum input length, and furthermore, to ensure that the chunked input text (e.g., the chunk list) preserves the most context of the sample input. Therefore, the machine learning model may generate outputs more efficiently and accurately.

In some embodiments, a sample input that includes two languages may be provided to demonstrate how the system 100 may chunk the sample input that includes two languages in detail. The sample input may include a text of "Click Forgot password? Introduzca la dirección de correo electrónico que utiliza para PayPal y haga clic en Siguiente." The system 100 may set a maximum input length of 30 for generating a segment, and the system 100 may detect the language used in the input text. When mix languages is detected (e.g., more than one language used in the input text), the system 100 may run character tokenization based on the maximum input length and then detect the languages iteratively. For this sample input, the system 100 may detect two languages, English and Spanish, used in the sample input, so that the system 100 may chunk the sample input into two separate inputs based on English and Spanish. The first chucked input may be an English input—"Click Forgot password?" The second chunked input may be a Spanish input—"Introduzca la dirección de correo electrónico que uBliza para PayPal y haga clic en Siguiente." For the English input, the system 100 may initialize sentence tokenizer, word tokenizer, and POS tagger for English language, and tokenize the English input into sentences based on detected language:

Tokenized Sentence 1: Click Forgot password?
The system 100 may compute a length of each of tokenized sentences (e.g.,
the tokenized sentence 1):
Length of Tokenized Sentence 1: 22.

Because the length of the Tokenized Sentence 1 is not longer than the maximum input length, the system 100 may not perform any further process (e.g., a word or character tokenization), and add the tokenized sentence to a final segment list. The system 100 may then merge sub-sentences together, in this case, since there is only one tokenized sentence (e.g., Tokenized Sentence 1), the system 100 may send/add this tokenized sentence to a final chunk list, and the final chunk list may be sent to a downstream application or a machine learning model.

The system 100 may then process the Spanish input. The system 100 may re-initialize/initialize sentence tokenizer, word tokenizer, and POS tagger for Spanish language. The system 100 may split the Spanish input into one or more segments, and then merge the segments and add the segments to a final chunk list using the actions and steps discussed in FIGS. 1 to 6. The system 100 may send the final chunk list to a downstream application or a machine learning model.

FIG. 8 illustrates an exemplary process 800 for generating a chunked text according to various embodiments of the disclosure. In some embodiments, at least a portion of the process 800 may be performed by the segment generating module 122 and the merging module 124, and apply approaches discussed in FIGS. 2-7. The process 800 begins by receiving (at step 805) an input text in at least one language. In some embodiments, the input text may be in two or more languages, e.g., the input text may include both English and Chinese. In such case, the process 800 may divide the input text into two or more segments corresponding to the two or more languages. In some embodiments, the language used in the input text may be specifiable, e.g., the language may be specified by the user or the system 100.

The process 800 determines (at step 810) a character limit for a segment derived from the input text based on the language. The segment may include at least one sentence, and a character number of the sentences is under the character limit. For example, the system 100 may set up a character limit of 512 for English input text (e.g., the language identified in step 805), which means that when there is an English input text exceeding the character limit of 512, the system 100 may derive a segment from the input text, and the segment may include one or more sentences whose character number in total is under the character limit of 512.

The process 800 identifies (at step 815) a set of characteristics of the input text based on the language. In some embodiments, the set of characteristics of the input text may include at least one of a word count, a conjunction, a punctuation, or a character count. For example, for English, an input text may often use a conjunction to separate two contextually independent sentences, the system 100 may identify a conjunction as one of the characteristics as it is usable to parse the input text.

The process 800 divides (at step 820) the input text into one or more segments sequentially based on the set of characteristics. For example, the system 100 may identify one or more sentences in the input text by identifying a period, semicolon, exclamation point, or a question mark. The system 100 may then perform a word count (e.g., the first characteristic) for each sentence. When none of the sentences meets or exceeds the character limit, the system 100 may divide the input text into the sentences as the segments derived from the input text. If there is a sentence longer than the character limit, the system may look for a conjunction (e.g., the second characteristic) in the sentence to divide the sentence into two sub-sentences, and each of the sub-sentence may be a segment.

In some embodiments, the process 800 may divide the input text into one or more segments sequentially by tokenizing each sentence identified in the input text. For each of the tokenized sentences, the process 800 may further perform a character count, determine that a character number of a corresponding sentence meets or exceeds the character limit based on the character count for the sentence, and identify a conjunction in the sentence; and divide the sentence into two sub-sentences based on the conjunction.

In some embodiments, for each of the two sub-sentences, the process 800 may further perform the character count, determine that a character number of at least one of the two sub-sentences meets or exceeds the character limit, and divide the sub-sentence that meets or exceeds the character limit based on the character count. For example, the system 100 may divide the sub-sentence into two parts by the character limit, e.g., the first part may include only 512 characters.

The process 800 generates (at step 825) a list of segments including the one or more segments. In some embodiments, each segment of the one or more segments may be appended to the list of segments sequentially. For example, the system 100 may append a segment to the list when the segment is divided or generated by step 820. In some embodiments, the segment generating module 122 may perform the step 805 to the step 825.

The process 800 then generates (at step 830) a list of combined segments by appending each segment in the list of segments sequentially. In some embodiments, generating the list of combined segments may include identifying a current segment and a next segment from the list of segments, determining that a third character number of the current segment and the next segment does not meet or exceed the character limit, combining the current segment and the next segment in a first text chunk, and adding the first text chunk to the list of combined segments. The first text chunk may include text of the current segment and the next segment. In some embodiments, the merging module 124 may perform the step 830.

In some embodiments, the process 800 may further include applying each combined segment in the list of combined segments sequentially to a machine learning model, and generating, via a machine learning model, an output corresponding to the list of combined segments. For example, the system 100 may send the list of combined segments (e.g., the chunked input text including chunks) to the machine learning model one by one sequentially (e.g., one chunk at a time, the first chunk appended to the list will be sent first), the machine learning model may generate the output based on the list of combined segments efficiently and accurately, because the processed input text (e.g., processed by steps 805 to 830) has been chunked into an appropriate length and preserves the most context from the original input text.

Figure 9:
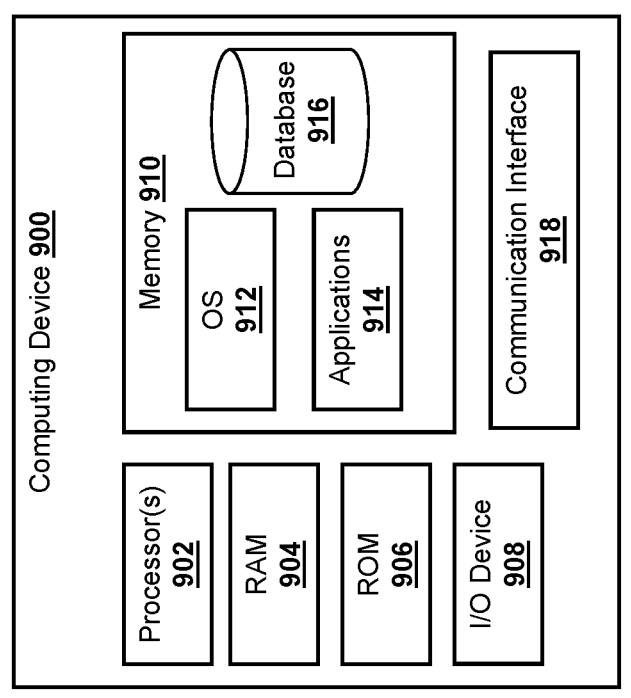
FIG. 9 is a block diagram that illustrates an exemplary of a computing device according to an embodiment of the present disclosure.

FIG. 9 illustrates a computing device 900 that may be used to implement the server 120, the user device 110, and the datasets database 130 according to various embodiments of the disclosure. For example, the computing device 900 may be the server 120 performing the actions disclosed in FIGS. 2 to 8. The computing device 900 may include a processor 902 for controlling overall operation of the computing device 900 and its associated components, including a random access memory (RAM) 904, a read only memory (ROM) 906, an input/output (I/O) device 908, a communication interface 918, and/or a memory 910. A data bus may interconnect the processor(s) 902, the RAM 904, the ROM 906, the memory 910, the I/O device 908, and/or the communication interface 918. In some embodiments, the computing device 900 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The input/output (I/O) device 908 may include a microphone, keypad, touch screen, and/or stylus motion, gesture, through which a user of the computing device 900 may provide input. The I/O device 908 may also include one or more of a speaker for providing audio output and a video display device for providing textual, audiovisual, and/or graphical output. Software may be stored within the memory 910 to provide instructions to the processor(s) 902 allowing the computing device 900 to perform various actions. For example, the memory 910 may store software used by the computing device 900, such as an operating system (OS) 912, application programs 914, an associated internal database 916, and/or any software that implements the process 800 as described herein. The various hardware memory units in the memory 910 may include volatile and nonvolatile, removable and non-removable media implemented in any method or technology for storage of information such as computer-readable instructions, data structures, program modules, or other data. The memory 910 may include one or more physical persistent memory devices and/or one or more non-persistent memory devices. The memory 910 may include, but is not limited to, a RAM, a ROM, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by the processor(s) 902.

The communication interface 918 may include one or more transceivers, digital signal processors, and/or additional circuitry and software for communicating via any network, wired or wireless, using any protocol as described herein.

The processor(s) 902 may include a single central processing unit (CPU), e.g., a single-core or multi-core processor, or may include multiple CPUs. The processor(s) 902 and associated components may allow the computing device 900 to execute a series of computer-readable instructions to perform some or all of the processes described herein. Although not shown in FIG. 9, various elements within the memory 910 or other components in computing device 900, may include one or more caches, for example, CPU caches used by the processor(s) 902, page caches used by the operating system 912, disk caches of a hard drive, and/or database caches used to cache content from the database 916. In various embodiments, the database 916 may be the datasets database 130 described in FIG. 1. For embodiments including a CPU cache, the CPU cache may be used by the processor(s) 902 to reduce memory latency and access time. The processor(s) 902 may retrieve data from or write data to the CPU cache rather than reading/writing to the memory 910, which may improve the speed of these operations. In some embodiments, a database cache may be created in which certain data from the database 916 is cached in a separate smaller database in a memory separate from the database 916, such as in the RAM 904 or on a separate computing device. For instance, in a multi-tiered application, a database cache on an application server may reduce data retrieval and data manipulation time by not needing to communicate over a network (e.g., the network 140 described in FIG. 1) with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 900 are described separately, functionality of the various components may be combined and/or performed by a single component and/or multiple computing devices in communication without departing from the invention.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:

a non-transitory memory; and one or more hardware processors coupled with the non-transitory memory and configured to read instructions from the non-transitory memory to cause the system to perform operations comprising:

receiving an input text in at least one language for processing by a machine learning (ML) model;

determining a character limit corresponding to the at least one language for a segment derived from the input text, wherein the segment includes at least one sentence comprising a first character number under the character limit;

based on the at least one language, identifying a set of characteristics of the input text, wherein each characteristic in the set of characteristics indicate a transition in the input text that is associated with a corresponding one of the at least one language;

dividing the input text into a plurality of segments sequentially based on the set of characteristics and the transition corresponding to each characteristic;

generating a list of segments including the plurality of segments, wherein each segment of the plurality of segments is appended to the list of segments sequentially;

determining a maximum input length for inputs to the ML model;

merging at least two of the plurality of segments into a text chunk of a plurality of text chunks that adhere to the maximum input length based on the list of segments and the corresponding one of the at least one language;

tagging each of the plurality of chunks with the corresponding one of the at least one language; and outputting the plurality of chunks tagged with the corresponding one of the at least one language to a computer system that executes the ML model; and generating, by computer system using the ML model, an output using, in place of the input text, the plurality of chunks tagged with the corresponding one of the at least one language.

2. The system of claim 1, wherein the operations further comprise:

identifying whether the input text is in two or more languages; and based on identifying that the input text is in two or more languages, dividing the input text into two or more segments corresponding to the two or more languages.

3. The system of claim 1, wherein the dividing the input text into the plurality of segments sequentially comprises:

tokenizing each sentence identified in the input text; and for each of the tokenized sentences:

performing a character count;

determining that a second character number of a corresponding sentence meets or exceeds the character limit based on the character count for the sentence;

identifying a conjunction in the sentence; and dividing the sentence into two sub-sentences based on the conjunction.

4. The system of claim 3, wherein the dividing the input text into the plurality of segments sequentially further comprises:

for each of the two sub-sentences:

performing the character count;

determining that a third character number of at least one of the two sub-sentences meets or exceeds the character limit; and dividing the at least one of the two sub-sentences based on the character count.

5. The system of claim 3, wherein the operations further comprise:

identifying a current segment and a next segment from the list of segments;

determining that a fourth character number of the current segment and the next segment does not meet or exceed the character limit;

combining the current segment and the next segment in a first text chunk, wherein the first text chunk comprises text of the current segment and the next segment;

adding the first text chunk to the list of combined segments; and generating a list of combined segments based on the combining and the adding.

6. The system of claim 1, wherein the operations further comprise:

generating, via the ML model, an output corresponding to the list of combined segments.

7. The system of claim 1, wherein the set of characteristics of the input text comprises at least one of a word count, a conjunction, a punctuation, or a character count.

8. A method, comprising:

receiving an input text in at least one language for processing by a machine learning (ML) model;

determining an identification of the at least one language based on the input text;

identifying at least one characteristic of the input text based on the identification of the at least one language, wherein each of the at least one characteristic indicates a transition in the input text that is associated with a corresponding one of the at least one language;

generating a plurality of segments from the input text based on the at least one characteristic and the transition corresponding to each characteristic;

determining a maximum input length for inputs to the ML model;

merging at least two of the plurality of segments based on the corresponding one of the at least one language and the maximum input length;

generating a chunked text based on the plurality of segments, wherein the chunked text comprises at least one chunk including text of the plurality of segments tagging the chunked text with the corresponding one of the at least one language; and outputting the chunked text to a computer system that executes the ML model; and generating, by computer system using the ML model, an output using, in place of the input text, the chunked text tagged with the corresponding one of the at least one language.

9. The method of claim 8, further comprising:

determining that the at least one language comprises a plurality of languages if the at least one language is not identifiable.

10. The method of claim 8, further comprising:

determining a character limit for the plurality of segments based on the at least one language.

11. The method of claim 10, wherein the generating the plurality of segments further comprises:

identifying one or more sentences in the input text; and for each identified one or more sentences:

performing a character count for the sentence;

determining that a first character number of the sentence meets or exceeds the character limit based on the character count for the sentence;

identifying a conjunction in the sentence; and dividing the sentence into two sub-sentences based on the conjunction.

12. The method of claim 11, wherein the generating the plurality of segments further comprises:

for each of the two sub-sentences:

performing the character count for the two sub-sentences;

determining that a second character number of at least one of the two sub-sentences meets or exceeds the character limit; and dividing the at least one of the two sub-sentences based on the character count.

13. The method of claim 11, wherein the generating the chunked text comprises:

identifying at least two segments from the input text;

identifying a current segment and a next segment from the at least two segments;

determining that a third character number of the current segment and the next segment does not meet or exceed the character limit;

combining the current segment and the next segment in a first text chunk, wherein the first text chunk comprises text of the current segment and the next segment; and adding the first text chunk in the chunked text.

14. The method of claim 8, wherein the at least one characteristic of the input text comprises at least one of a word count, a conjunction, a punctuation, or a character count.

15. A non-transitory machine-readable medium having stored thereon machine-readable instructions executable to cause a machine to perform operations comprising:

receiving an input text in at least one language for processing by a machine learning (ML) model;

determining a character limit corresponding to the at least one language for a segment derived from the input text, wherein the segment includes at least one sentence comprising a first character number under the character limit;

based on the at least one language, identifying a set of characteristics of the input text, wherein each characteristic in the set of characteristics indicate a transition in the input text that is associated with a corresponding one of the at least one language;

dividing the input text into a plurality of segments sequentially based on the set of characteristics and the transition corresponding to each characteristic;

generating a list of segments including the plurality of segments, wherein each segment of the plurality of segments is appended to the list of segments sequentially;

determining a maximum input length for inputs to the ML model;

merging at least two of the plurality of segments into a text chunk of a plurality of text chunks that adhere to the maximum input length based on the list of segments and the corresponding one of the at least one language;

tagging each of the plurality of chunks with the corresponding one of the at least one language; and outputting the plurality of chunks tagged with the corresponding one of the at least one language to a computer system that executes the ML model; and generating, by computer system using the ML model, an output using, in place of the input text, the plurality of chunks tagged with the corresponding one of the at least one language.

16. The non-transitory machine-readable medium of claim 15, wherein the operations further comprise:

identifying whether the input text is in two or more languages; and based on identifying that the input text is in two or more languages, dividing the input text into two or more segments corresponding to the two or more languages.

17. The non-transitory machine-readable medium of claim 15, wherein the dividing the input text into the plurality of segments sequentially comprises:

tokenizing each sentence identified in the input text; and for each of the tokenized sentences:

performing a character count for the sentence;

determining that a first character number of a corresponding sentence meets or exceeds the character limit based on the character count for the sentence;

identifying a conjunction in the sentence; and dividing the sentence into two sub-sentences based on the conjunction.

18. The non-transitory machine-readable medium of claim 17, wherein the dividing the input text into the plurality of segments sequentially further comprises:

for each of the two sub-sentences:

performing the character count;

determining that a second character number of at least one of the two sub-sentences meets or exceeds the character limit; and dividing the at least one of the two sub-sentences based on the character count.

19. The non-transitory machine-readable medium of claim 17, wherein the operations further comprise:

identifying a current segment and a next segment from the list of segments;

determining that a third character number of the current segment and the next segment does not meet or exceed the character limit;

combining the current segment and the next segment in a first text chunk, wherein the first text chunk comprises text of the current segment and the next segment; and adding the first text chunk to the list of combined segments.

20. The non-transitory machine-readable medium of claim 15, wherein the operations further comprise:

generating, via the ML model, an output corresponding to the list of combined segments.

* * * * *